US010200292B2

(12) United States Patent
Gasparakis et al.

(10) Patent No.: US 10,200,292 B2
(45) Date of Patent: Feb. 5, 2019

(54) TECHNOLOGIES FOR ALIGNING NETWORK FLOWS TO PROCESSING RESOURCES

(71) Applicant: Intel Corporation, Santa Clara, CA (US)

(72) Inventors: Iosif Gasparakis, Tigard, OR (US); Brian P. Johnson, Forest Grove, OR (US); Patrick G. Kutch, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 14/467,917

(22) Filed: Aug. 25, 2014

(65) Prior Publication Data
US 2016/0057066 A1 Feb. 25, 2016

(51) Int. Cl.
*G06F 15/173* (2006.01)
*H04L 12/801* (2013.01)
(Continued)

(52) U.S. Cl.
CPC ............ *H04L 47/33* (2013.01); *G06F 9/48* (2013.01); *H04L 41/044* (2013.01); *H04L 47/35* (2013.01);
(Continued)

(58) Field of Classification Search
CPC ....... H04L 47/33; H04L 41/044; H04L 47/35; H04L 67/1002; H04L 67/327; H04L 69/321; H04L 69/329; G06F 9/48
(Continued)

(56) References Cited

U.S. PATENT DOCUMENTS 6,338,078 B1    1/2002  Chang et al.
9,450,817 B1 *  9/2016  Bahadur ............. H04L 41/0806
(Continued)

FOREIGN PATENT DOCUMENTS

JP    2013-183440 A    9/2013
TW     201427344 A     7/2014

OTHER PUBLICATIONS

Taiwan Office Action and Search Report for Application No. 104123265, dated Aug. 18, 2016, 15 pages.
(Continued)

*Primary Examiner* — Frantz B Jean
(74) *Attorney, Agent, or Firm* — Barnes & Thornburg LLP

(57) ABSTRACT

Technologies for aligning network flows to processing resources include a computing device having multiple processing nodes, a network switch, and a network controller operating in a software-defined network. Each processing node of the computing device may include a processor, memory, and network adapter. The network switch may receive a network packet and request forwarding information from the network controller. The network controller may determine flow information corresponding to the network packet that indicates the application targeted by the network packet and the processing node executing the application. The flow information may be transmitted to the computing device, which may program a flow filter in the network adapter of the processing node executing the application. The network controller may also transmit forwarding information to the network switch, which may forward the received network packet to the network adapter of the processing node executing the application based on the forwarding information.

21 Claims, 7 Drawing Sheets

(51) Int. Cl.
  *H04L 12/24* (2006.01)
  *H04L 29/08* (2006.01)
  *G06F 9/48* (2006.01)

(52) U.S. Cl.
  CPC ........ *H04L 67/1002* (2013.01); *H04L 67/327* (2013.01); *H04L 69/321* (2013.01); *H04L 69/329* (2013.01)

(58) Field of Classification Search
  USPC ........................................................ 709/226
  See application file for complete search history.

(56) References Cited

U.S. PATENT DOCUMENTS

| | | | |
|---|---|---|---|
| 9,825,860 B2* | 11/2017 | Azgin | .................. H04L 45/306 |
| 10,009,287 B2* | 6/2018 | Djukic | .................. H04L 47/782 |
| 2006/0195698 A1 | 8/2006 | Pinkerton et al. | |
| 2007/0234319 A1* | 10/2007 | Matsutsuka | ............... G06F 8/74 |
| | | | 717/140 |
| 2009/0300209 A1* | 12/2009 | Elzur | ..................... H04L 47/10 |
| | | | 709/234 |
| 2010/0241831 A1 | 9/2010 | Mahadevan et al. | |
| 2011/0158254 A1* | 6/2011 | Basso | .................. H04L 47/522 |
| | | | 370/468 |
| 2014/0003232 A1* | 1/2014 | Guichard | ................ H04L 67/16 |
| | | | 370/230 |
| 2014/0056141 A1* | 2/2014 | Breternitz, Jr. | ......... H04L 49/10 |
| | | | 370/235 |
| 2014/0162903 A1 | 6/2014 | Raftery | |
| 2015/0324306 A1* | 11/2015 | Chudgar | .................. G06F 13/385 |
| | | | 710/308 |

OTHER PUBLICATIONS

European Search Report for Patent Application No. 15176666.4-1853, dated Jan. 29, 2016, 7 pages.
Office Action and English Translation of Korean Patent Application No. 2015-0104443, dated Jun. 1, 2016, 9 pages.
Notice of Reasons for Rejection and English Translation for Japanese Patent Application No. 2015-141757, dated Aug. 9, 2016, 3 pages.
Reasons for Rejection and English Translation for Korean Patent Application No. 2015-0104443, dated Nov. 8, 2016, 6 pages.
First Office Action dated Feb. 14, 2018 for Chinese patent Application No. 201510440535.5 with translation, 27 pages.

* cited by examiner

TECHNOLOGIES FOR ALIGNING NETWORK FLOWS TO PROCESSING RESOURCES

BACKGROUND

Modern computing devices have become ubiquitous tools for personal, business, and social uses. As such, many modern computing devices are capable of connecting to various data networks, including the Internet and corporate intranets, to retrieve and receive data communications over such networks. Oftentimes, a computing device connected to one network needs to communicate with a computing device connected on a different network.

Software-defined networking (SDN) is a networking architecture in which decisions regarding how network traffic is to be processed and the devices or components that actually process the network traffic are decoupled into separate planes (i.e., the control plane and the data plane). In SDN environments, a centralized SDN controller is used to make forwarding decisions for network traffic instead of a network device such as, for example, a network switch. Typically, the forwarding decisions are communicated to a network device operating in the SDN environment, which in turn forwards network packets associated with the network traffic to the next destination based on the forwarding decisions made by the SDN controller. SDN controllers, however, often lack the ability to make fine-grained forwarding decisions for network traffic. Specifically, typical SDN controllers make forwarding decisions on a system level rather than on a device architecture level. That is, typical SDN controllers are not able to make forwarding decisions based on the individual components and/or a group of components of a destination computing device most optimal to receive and process specific types of network traffic.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
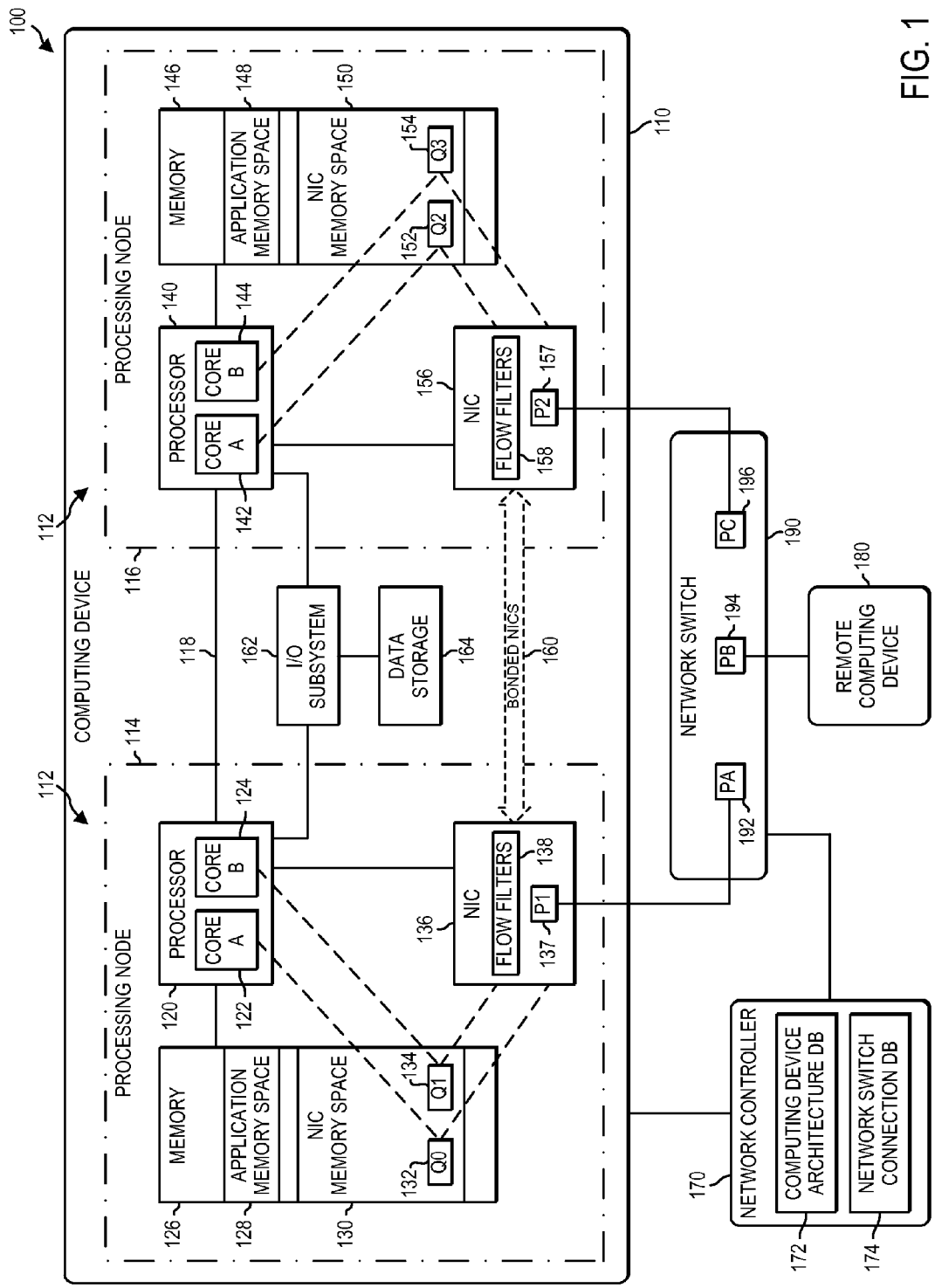
FIG. 1 is a simplified block diagram of at least one embodiment of a system for aligning network flows to processing resources of a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment a system 100 for aligning network flows to processing resources includes a computing device 110, a network controller 170, a remote computing device 180, and a network switch 190, each of which may be capable of operating in a software-defined networking (SDN) environment. In use, the network switch 190 may receive a network packet from the remote computing device 180. In some embodiments, the network packet may be targeted or otherwise directed to an application being executed by a processor (e.g., the processor 120 or the processor 140) of one of the processing nodes 112 (e.g., the processing node 114 or the processing node 116) of the computing device 110. In such embodiments, the network switch 190 requests forwarding information for the received network packet from the network controller 170, which includes architecture information associated with the computing device 110 and/or the SDN environment (e.g., topology data, configuration data, layout data, and/or any other type of data describing hardware or software components of the computing device 110 and/or a network). In some embodiments, the network controller 170 also includes information indicative of what applications are being executed within which processing node 112 of the computing device 110. Using the architecture information, the network controller 170 determines and/or generates network flow information corresponding to the received network packet. The network flow information may identify or otherwise be indicative of the particular processing node 112 (e.g., the processing node 114 or the processing node 116) executing the application targeted by the received network packet. In some embodiments, the network flow information may also identify or otherwise be indicative of the network adapter (e.g., the NIC 136 or the NIC 156) of the particular processing node 112 to which the received network packet should be forwarded.

After determining the network flow information, the network controller 170 transmits the network flow information to the computing device 110, which programs or otherwise configures a flow filter in the identified network adapter (e.g., the NIC 136 or the NIC 156). In some embodiments, the flow filter may be configured to copy network packets associated with a network flow (e.g., the received network packet and any subsequent network packets) to a particular network memory queue (e.g., Q0 132, Q1 134, Q2 152, Q3 154) allocated to the identified network adapter (e.g., the NIC 136 or the NIC 156). In some embodiments, the network memory queues (e.g., Q0 132, Q1 134, Q2 152, Q3 154) may be configured to operate as either bidirectional or unidirectional memory queues.

After the flow filter has been programmed by the computing device 110, the network controller 170 determines forwarding information for the received network packet based on the flow information. The forwarding information may identify or otherwise be indicative of the network adapter (e.g., the NIC 136 or the NIC 156) of the particular processing node 112 to which the received network packet should be forwarded. In some embodiments, the forwarding information may include information indicative of a particular interface or port (e.g., PA 192, PB 194, PC 196) of the network switch 190 communicatively coupled to the identified network adapter (e.g., the NIC 136 or the NIC 156). The network controller 170 may transmit the forwarding information to the network switch 190, which may utilize the forwarding information to forward the received network packet to the particular port (e.g., PA 192, PB 194, PC 196) of the network switch 190 communicatively coupled to the identified network adapter (e.g., the NIC 136 or the NIC 156). It should be appreciated that by maintaining architecture information associated with the computing device 110 and/or the SDN environment, the network controller 170 may align a network flow to a particular processing node 112 executing a particular application. In that way, processing of network packets associated with a particular network flow and execution of the application targeted by that flow may occur within the same processing node 112, which is a more efficient use of memory resources and available network bandwidth, lowers network and/or processing latency, enables less power to be consumed by the computing device 110, and enables less processing resources to be utilized to process network packets. For example, processing network packets of a network flow within the same processing node 112 as the one that the targeted application is being executed is more efficient than processing network packets of a network flow in one processing node 112 (e.g., the processing node 112) and transmitting (e.g., forwarding, sending, etc.) those packets to a different processing node 112 (e.g., the processing node 114) within which the targeted application is executing via one or more communication links (e.g., QuickPath Interconnects (QPI) 118, point-to-point links, bus links, wires, cables, light guides, printed circuit board traces, etc.). Transmitting network packets between processing nodes 112 in such a manner may potentially impact the latency, jitter, and throughput of the computing device 110. This may especially be true in cases in which there are a large number of new and/or existing network flows or network packets that need to be processed in a different processing node 112 than the one in which the targeted application is executing.

The computing device 110 may be embodied as, or otherwise include, any type of computing device capable of performing the functions described herein including, but not limited to a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing device. In some embodiments, the computing device 110 is capable of operating in a software-defined networking (SDN) environment. As discussed in more detail below, the illustrative computing device 110 includes multiple processing nodes 112, each of which includes a processor, a memory, and a network adapter. As shown in FIG. 1, the illustrative computing device 110 also includes an input/output (I/O) subsystem 162 and a data storage 164. Of course, the computing device 110 may include other or additional components, such as those commonly found in a computer (e.g., various input/output devices), in other embodiments.

In some embodiments, each processing node 112 of the computing device 110 may be embodied as a Non-uniform Memory Access (NUMA) node. In the illustrative embodiment, the computing device 110 includes the processing node 114 and the processing node 116. The illustrative processing node 114 includes a processor 120, a memory 126, and a network interface card (NIC) 136. In some embodiments, the processor 120, the memory 126, and the NIC 136 within processing node 114 may be communicatively coupled to each other via one or more communication links (i.e., point-to-point links, bus links, wires, cables, light guides, printed circuit board traces, etc.). Additionally, in some embodiments, one or more of the illustrative components of the processing node 114 may be incorporated in, or otherwise form a portion of, another component. For example, the memory 126, or portions thereof, may be incorporated in the processor 120 in some embodiments.

The processor 120 of the processing node 114 may be embodied as any type of processor capable of performing the functions described herein. For example, in some embodiments, the processor 120 may be embodied as a single core processor, digital signal processor, microcontroller, or other processor or processing/controlling circuit. In other embodiments, such as the one illustratively shown in FIG. 1, the processor 120 may be embodied as a multi-core processor having multiple processor cores (e.g., core A 122 and core B 124). In such embodiments, each processor core 122, 124 of the processor 120 is capable of executing one or more applications.

The memory 126 the processing node 114 may be embodied as any type of volatile or non-volatile memory or data storage capable of performing the functions described herein. In operation, the memory 126 may store various data and software used during operation of the computing device 110 such as operating systems, applications, programs, libraries, and drivers. For example, in some embodiments, a portion of the memory 126 (e.g., application memory space 128) may be allocated or otherwise reserved for use by an application being executed by the processor core A 122 and/or the processor core B 124. Additionally, in some embodiments, another portion of the memory 126 (e.g., NIC memory space 130) may be allocated or otherwise reserved for the storage of data that is to be sent by the NIC 136 and or data that is received by the NIC 136. In such embodiments, the NIC memory space 130 may include one or more memory queues (e.g., the Q0 132 and the Q1 134) for storing data (e.g., network packets, etc.) that is to be sent or received via a port P1 137 (e.g., an interface) of the NIC 136. In the illustrative embodiment, the memory 126 is communicatively coupled to the processor 120 via one or more communication links (i.e., point-to-point links, bus links, wires, cables, light guides, printed circuit board traces, etc.).

The NIC 136 of the processing node 114 of the computing node(s) 110 may be embodied as any type of communication circuit, device, or collection thereof, capable of enabling communications between the computing device 110 and/or the processing node 114 of the computing device 110 and other computing devices via one or more communication networks (e.g., local area networks, personal area networks, wide area networks, cellular networks, a global network such as the Internet, etc.). For example, in some embodiments, the NIC 136 of the processing node 114 may be capable of enabling communications between the processing node 114 of the computing device 110 and the remote computing device 180. The NIC 136 may be configured to use any one or more communication technologies (e.g., wireless or wired communications) and associated protocols (e.g., Ethernet, Wi-Fi®, WiMAX, etc.) to effect such communication. In the illustrative embodiment, the NIC 136 includes or is otherwise communicatively coupled to a port (e.g., P1 137) or communication interface. The port (e.g., P1 137) may be configured to communicatively couple the processing node 114 to any number of other computing devices (e.g., the remote computing device 180) and/or networks (e.g., physical or logical networks). For example, the illustrative port 137 communicatively couples the NIC 136 of the processing node 114 to the network switch 190, which may be communicatively coupled to the remote computing device 180, the network controller 170, and/or any number of other computing devices or networks.

In the illustrative embodiment, the NIC 136 is communicatively coupled to the processor 120 via one or more communication links (i.e., point-to-point links, bus links, wires, cables, light guides, printed circuit board traces, etc.). For example, in some embodiments, the NIC 136 is embodied as a Peripheral Component Interconnect Express (PCIe) device communicatively coupled to the processor 120 via a PCIe I/O bus of the processing node 114. Of course, it should be appreciated that the NIC 136 may be embodied as any other type of communication device communicatively coupled to the processor 120 of the processing node 114.

In some embodiments, the NIC 136 may also include one or more flow filters 138. As discussed in more detail below, the one or more flow filters 138 may be programmed in the NIC 136 by the computing device 110 based at least in part on, or otherwise as a function of, network flow information received from the network controller 170. In some embodiments, the flow filters 138 specify a particular memory queue (e.g., the Q0 132, the Q1 134, etc.) in the NIC memory space 130 assigned to or otherwise allocated for storage of network packets that are received by the NIC 136 and/or network packets that are to be transmitted by the NIC 136. Additionally, in some embodiments, the flow filters 138 specify a particular memory queue (e.g., the Q0 132, the Q1 134, etc.) in the NIC memory space 130 allocated for storage of network packets that are received by a particular port (e.g., the P1 137) of the NIC 136 and/or network packets that are to be transmitted by a particular port (e.g., the P1 137) of the NIC 136. Additionally or alternatively, in some embodiments, the NIC 136 (or a driver or the NIC 136) may pre-allocate or pre-assign a memory queue (e.g., the Q0 132, the Q1 134, etc.) in the NIC memory space 130 for each port (e.g., P1 137) included within the NIC 136. That is, each port (e.g., P1 137) of the NIC 136 may be allocated or otherwise assigned a specific memory queue (e.g., the Q0 132, the Q1 134, etc.) in the NIC memory space 130 prior to the computing device 110 programming the flow filters 138 in the NIC 136. For example, in some embodiments, the NIC 136 and/or an associated driver may pre-allocate one or more memory queues (e.g., the Q0 132, the Q1 134, etc.) in the NIC memory space 130 of the processing node 114 during initialization of the computing device 110. In that way, the memory queues (e.g., the Q0 132, the Q1 134, etc.) for each port (e.g., P1 137) included within the NIC 136 are allocated within the same processing node 114 as the NIC 136. It should be appreciated that, in some embodiments, the network memory queues (e.g., Q0 132, Q1 134, Q2 152, Q3 154) may be configured to operate as bidirectional memory queues (i.e., transmission and reception) or unidirectional memory queues (i.e., transmission or reception).

The illustrative processing node 116 includes a processor 140, a memory 146, and a NIC 156. The processor 140 of the processing node 116 may include multiple processor cores (e.g., the core A 142 and the core B 144). The memory 146 of the processing node 116 includes a portion of memory (e.g., application memory space 148) allocated for use by an application being executed by the processor core A 142 and/or the processor core B 144, a portion of memory (e.g., NIC memory space 150) allocated for the storage of data that is to be sent by the NIC 156 and/or received by the NIC 156, and one or more memory queues (e.g., the Q2 152 and the Q3 154) for storing data (e.g., network packets, etc.) that is to be sent or received via a port 157 (e.g., an interface) of the NIC 156. The illustrative NIC 156 includes or is otherwise communicatively coupled to a port (e.g., P2 157). Additionally, in some embodiments, the NIC 156 includes one or more flow filters 158. Those components of the processing node 116 may be similar to the corresponding components of the processing node 114, the description of which is applicable to the corresponding components of the processing node 116 and is not repeated herein for clarity of the description.

In some embodiments, the NIC 136 and the NIC 156 may be bonded, trunked, or otherwise aggregated (as illustratively shown by logical connection 160) in order to increase throughput, implement load balancing, and/or provide faulttolerance. In such embodiments, the NIC 136 and the NIC 156 may form a logical network interface, which may be assigned a single Internet Protocol (IP) address for receiving network packets from other computing devices such as, for example, the remote computing device 180. Of course, it should be appreciated that although the logical network interface formed from bonding the NIC 136 and the NIC 156 may be assigned a single IP address, each of the NIC 136 and the NIC 156 may have separate media access control (MAC) address. Additionally, in some embodiments, the computing device 110 may include one or more management ports (not shown), which may communicatively couple the computing device 110 to the network controller 170. In such embodiments, the management ports of the computing device 110 may be used for sending and receiving information or messages (e.g., architectural information, forwarding information, etc.) to/from the network controller 170 as discussed in more detail below.

Each of the processor 120 and the processor 140 may be communicatively coupled to the I/O subsystem 162, which may be embodied as circuitry and/or components to facilitate input/output operations with other components of the computing device 110. For example, the I/O subsystem 162 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 162 may form a portion of a system-on-a-chip (SoC) and be incorporated, along with the components of a processing node 112 (e.g., the processor, memory, and network adapter) and other components of the computing device 110, on a single integrated circuit chip. For example, in some embodiments, the I/O subsystem 162, the processor 120, the memory 126, and the NIC 136 may be incorporated on a single integrated circuit chip.

The data storage 164 may be embodied as any type of device or devices configured for short-term or long-term storage of data such as, for example, memory devices and circuits, memory cards, hard disk drives, solid-state drives, or other data storage devices. For example, the data storage 164 may be configured to store one or more operating systems to be initialized and/or executed by the computing device 110. In some embodiments, portions of the operating system(s) may be copied to the memory 126 and/or the memory 146 during operations for faster processing and/or any other reason.

The network controller 170 may be embodied as, or otherwise include, any type of computing device capable of performing the functions described herein including, but not limited to, a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing or networking device. As such, the network controller 170 may include devices and structures commonly found in a network controller or similar computing devices such as processors, memory devices, communication circuitry, and data storages, which are not shown in FIG. 1 for clarity of the description. In the illustrative embodiment, the network controller 170 is capable of operating in a software-defined networking (SDN) environment. As such, the network controller 170 may receive data and/or information requests from the computing device 110, the network switch 190, and/or other computing devices capable of operating in an SDN environment. For example, the network controller 170 may receive architectural information from the computing device 110 that defines or is otherwise indicative of an architecture of each processing node 112 of the computing device 110. The network controller 170 may also receive connection information from the network switch 190 that defines or is otherwise indicative of one or more network connections (e.g., communication links) between one or more ports (e.g., PA 192, PB 194, PC 196) of the network switch 190 and the computing device 110, the network controller 170, the remote computing device 180, and/or any other computing device or communication network.

In some embodiments, the network controller 170 is configured to receive one or more requests for forwarding information from the network switch 190. Each forwarding information request may be associated with a network packet received by the network switch 190. In response to receiving a request for forwarding information, the network controller 170 may determine network flow information and forwarding information associated with the network packet received by the network switch 190 based at least in part on, or otherwise as a function of, the architectural information received from the computing device 110 and the connection information received from the network switch 190. In operation, the network controller 170 may send the determined network flow information to the computing device 110 so that a flow filter in one of the network adapters (e.g., the NIC 136 or the NIC 156) may be programmed. Additionally, the network controller 170 may send the forwarding information to the network switch 190, which may use the forwarding information to forward the received network packet to the network adapter (e.g., the NIC 136 or the NIC 156) of the computing device 110 in which the flow filter was programmed. In that way the network controller 170 may align a network flow to particular processing components of the computing device 110 based the architectural information of the computing device 110.

In some embodiments, the network controller 170 may maintain or otherwise store the architecture information received from the computing device 110 in a computing device architecture database 172. Additionally, the network controller 170 may maintain or otherwise store the connection information received from the network switch 190 in a network switch connection database 174. In other embodiments, the architecture information and the connection information may be stored or maintained in the same database rather than in separate databases. Of course, it should be appreciated that although the architecture information and the connection information are described as being stored in more or more databases in the illustrative embodiment, the architecture information and/or the connection information may be stored in a data structure (e.g., a document, file, etc.) having a different format in other embodiments. For example, the architecture information and/or the connection information may be embodied as a comma-separated value (CSV) file, a text file, an encrypted data file, an Extensible Markup Language (XML) document having one or more XML elements, or any other format suitable to store architecture information and/or connection information.

The remote computing device 180 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the remote computing device 180 may include devices and structures commonly found in computing devices such as processors, memory devices, communication circuitry, and data storages, which are not shown in FIG. 1 for clarity of the description. In some embodiments, the remote computing device 180 may be configured to transmit and/or receive network packets to/from the computing device 110 via the network switch 190. In such embodiments, the remote computing device 180 may be directly connected to a port (e.g., the PB 194) of the network switch 190. Of course it should be appreciated that the remote computing device 180 may not be directly connected to the network switch 190 in other embodiments. For example, in some embodiments, the remote computing device 180 may be connected to a remote network (or a series of remote networks) that is communicatively coupled to the network switch 190.

The network switch 190 may be embodied as, or otherwise include, any type of networking or computing device capable of performing the functions described herein including, but not limited to a network switch, a network router, a network hub, a wireless access point, a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the network switch 190 may include devices and structures commonly found in a network switch or similar computing devices such as processors, memory devices, communication circuitry, and data storages, which are not shown in FIG. 1 for clarity of the description. In the illustrative embodiment, the network switch 190 is capable of operating in a software-defined networking (SDN) environment that may include, among other devices, the computing device 110 and the network controller 170. The illustrative network switch 190 includes one or more ports or interfaces, which may be communicatively coupled to one or more ports or interfaces of the computing device 110, the network controller 170, the remote computing device 180, and/or any other computing device and/or communication network via one or more communication links (e.g., point-to-point links, bus links, wires, cables, light guides, etc.). For example, the illustrative network switch 190 includes a first port (e.g., the PA 192), which may be communicatively coupled to a port (e.g., the P1 137) of the NIC 136 of the computing device 110. The illustrative network switch 190 also includes a second port (e.g., the PB 194), which may be communicatively coupled to a port of the remote computing device 180. Additionally, the network switch 190 may also include a third port (e.g., the PC 196), which may be may be communicatively coupled to a port (e.g., the P2 157) of the NIC 156 of the computing device 110. Of course, the network switch 190 may include additional or fewer ports than PA 192, PB 194, and PC 196 in other embodiments. In some embodiments, the network switch 190 may also include a management port (not shown), which may communicatively couple the network switch 190 and the network controller 170.

In some embodiments, the network switch 190 receives one or more network packets from the remote computing device 180, which may be communicatively coupled to the network switch 190 via a port (e.g., PB 194) of the network switch 190. It should be appreciated that in some embodiments, the network switch 190 may also receive one or more network packets from a network adapter (e.g., the NIC 136 or the NIC 156) of the computing device 110. Additionally, in some embodiments, the network switch 190 is configured to transmit connection information to the network controller 170 that defines or is otherwise indicative of one or more network connections (e.g., communication links) between one or more ports (e.g., PA 192, PB 194, PC 196) of the network switch 190 and the computing device 110, the network controller 170, the remote computing device 180, and/or any other computing device or communication network. In some embodiments, the connection information transmitted to the network controller 170 may be based on local connection information maintained by the network switch 190. Such local connection information of the network switch 190 may include a media access control (MAC) address associated with each computing device (e.g., the computing device 110, the network controller 170, the remote computing device 180, and/or any other computing device) communicatively coupled to the network switch 190. Additionally, the local connection information of the network switch 190 may include data that identifies the port (e.g., PA 192, PB 194, PC 196) of the network switch 190 to which each computing device is communicatively coupled. In some embodiments, the local connection information may be used to map the MAC address of a computing device to the particular port (e.g., PA 192, PB 194, PC 196) of the network switch 190 to which the computing device is connected or otherwise communicatively coupled.

Additionally, in some embodiments, the network switch 190 is also configured to request forwarding information from the network controller 170. In some embodiments, the forwarding information may be associated with network packets received from the remote computing device 180, the computing device 110, and/or any other computing device or communication network. In such embodiments, the network switch 190 may be configured to forward the received network packets based on the forwarding information received from the network controller 170. To do so, the network switch 190 may maintain one or more flow tables including one or more flow entries. In some embodiments, each flow entry of the flow table(s) may be used by the network switch 190 to identify one or more network flows, the network packets associated with each network flow, and a destination computing device to which the network packets of each network flow should be forwarded. In such embodiments, the flow entries of the flow table(s) may be used by the network switch 190 to determine the particular port (e.g., PA 192, PB 194, PC 196) of the network switch 190 to which the received network packet (and subsequently received network packets) should be forwarded. Additionally, in embodiments in which the network switch 190 maintains the forwarding table(s), the network switch 190 may be configured to add flow entries to the forwarding table(s) based on the forwarding information received from the network controller 170.

Figure 2:
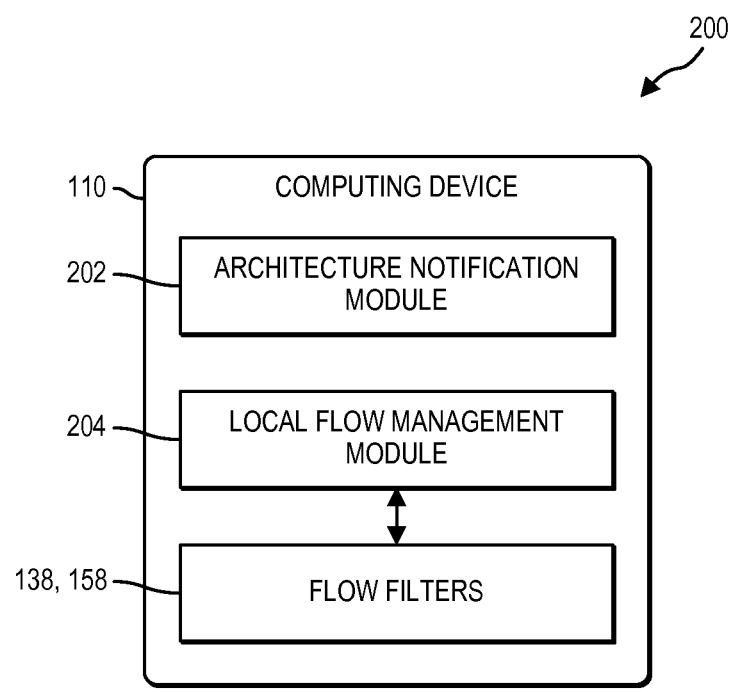
FIG. 2 is a simplified block diagram of at least one embodiment of an environment of the computing device of the system FIG. 1.

Referring now to FIG. 2, in use, the computing device 110 establishes an environment 200 during operation. The illustrative environment 200 includes an architecture notification module 202, a local flow management module 204, and one or more flow filters 138, 158. Each of the modules, logic, and other components of the environment 200 may be embodied as hardware, software, firmware, or a combination thereof. For example, each of the modules, logic and other components of the environment 200 may form a portion of, or otherwise be established by, the processors 120, 140 or other hardware components of the computing device 110. It should be appreciated that the computing device 110 may include other components, sub-components, modules, and devices commonly found in a computing device, which are not illustrated in FIG. 2 for clarity of the description.

The architecture notification module 202 may be configured to transmit architectural information to the network controller 170. The architectural information defines an architecture of each processing node 112 of the computing device 110. In some embodiments, the architectural information transmitted by the architecture notification module 202 includes application data indicative of the applications executed by each of the processing nodes 112 (e.g., the processing node 114 and the processing node 116) of the computing device 110, processor core data indicative of the processor cores (e.g., core A 122, core B 124, core A 142, core B 144) of the processors (e.g., the processor 120 and the processor 140) of each of the processing nodes 112, memory queue data indicative of allocated memory queues (e.g., Q0 132, Q1 134, Q2 152, Q3 154) in each of the processing nodes 112, and/or port data indicative of the ports (e.g., P1 137 and P2 157) of the network adapters (e.g., the NIC 136 and the NIC 156) of each of the processing nodes 112. Additionally or alternatively, the architectural information transmitted by the architecture notification module 202 may include data indicative of the applications executed by each processor core (e.g., core A 122, core B 124, core A 142, core B 144) of each processor (e.g., the processor 120 and the processor 140) of each processing node 112 (e.g., the processing node 114 and the processing node 116) of the computing device 110.

In some embodiments, the architecture notification module 202 may be configured to transmit the architectural information to the network controller 170 upon initialization of the computing device 110 or a component thereof. For example, the architecture notification module 202 may be configured to transmit the architectural information to the network controller 170 in response to completion of a boot process by the computing device 110 and/or in response to initialization or execution of a particular application by a processing node 112 or a processor core of a processor of the computing device 110. In another example, the architecture notification module 202 may be configured to transmit the architectural information to the network controller 170 based on a configurable reference architecture notification interval and/or based on one or more instructions or commands received from the network controller 170 requesting that the architecture notification module 202 transmit the architectural information. In some embodiments, the architecture notification module 202 may be configured to transmit the architectural information to the network controller 170 as one or more representational state transfer (REST) messages. Of course, it should be appreciated that any other suitable messaging protocol and/or format (e.g., XML-based protocols and/or formats such as Simple Object Access Protocol (SOAP), open standards-based protocols and/or formats such as JavaScript Object Notation (JSON), etc.) may be used by the architecture notification module 202 to transmit the architectural information to the network controller 170.

The local flow management module 204 may be configured to receive network flow information from the network controller 170. The network flow information received from the network controller 170 may be associated with a network packet transmitted by the remote computing device 180 and received by the network switch 190. The network flow information may identify a target processing node 112 (e.g., the processing node 114) of the computing device 110 to process the network packet based on an application executed by the target processing node 112 (e.g., the processing node 114). In some embodiments, the network flow information may also identify the target processing node 112 (e.g., the processing node 114) to process the network packet based on an application executed by a particular processor core (e.g., core A 122 or the core B 124) of the target processing node 112 (e.g., the processing node 114). It should be appreciated that in some embodiments, the local flow management module 204 may be embodied as a flow director module of the computing device 110 and/or a network adapter (e.g., NIC 136 or NIC 156) of the computing device 110.

In some embodiments, the local flow management module 204 may also be configured to program one or more flow filters 138 in the network adapter (e.g., the NIC 136) of the target processing node 112 (e.g., the processing node 114) based on network flow information received from the network controller 170. The one or more flow filters (e.g., the flow filter 138) may specify a memory queue (e.g., Q0 132 or Q1 134) in the memory (e.g., the memory 126) of the target processing node 112 (e.g., the processing node 114) to receive the network packet (and subsequent related network packets) from the network switch 190. In some embodiments, the one or more flow filters (e.g., the flow filter 138) programmed by the local flow management module 204 may be used by the network adapter (e.g., the NIC 136) of the target processing node 112 to copy the network packet received from the network switch 190 to the specified memory queue (e.g., Q0 132 or Q1 134) in the memory (e.g., the memory 126) of the target processing node 112 (e.g., the processing node 114).

Figure 3:
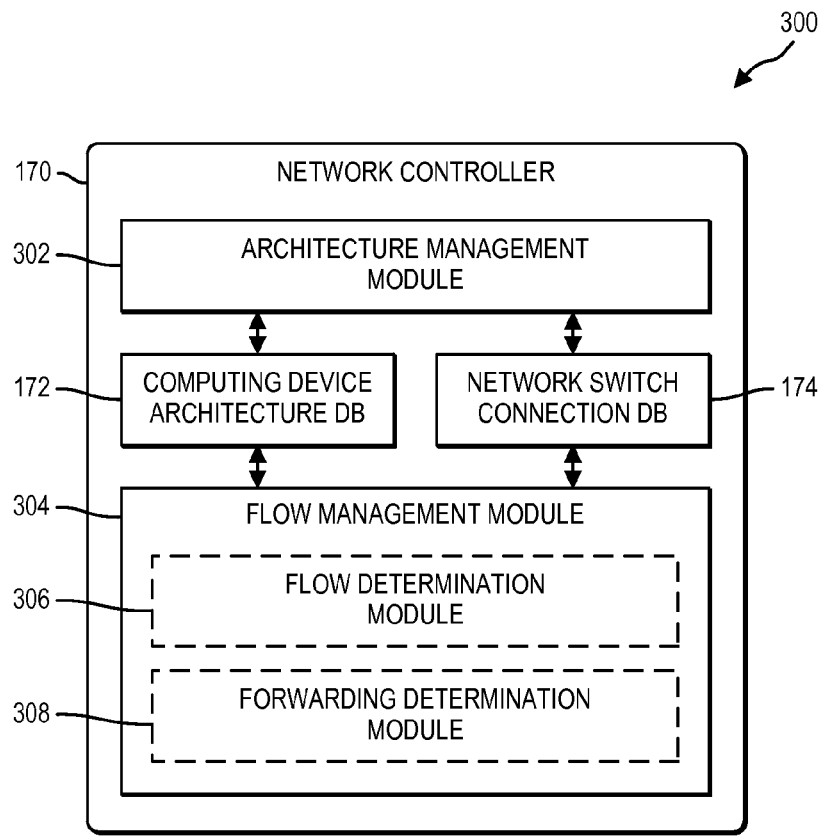
FIG. 3 is a simplified block diagram of at least one embodiment of an environment of a network controller of the system of FIG. 1.

Referring now to FIG. 3, in use, the network controller 170 establishes an environment 300 during operation. The illustrative environment 300 includes an architecture management module 302, the computing device architecture database 172, the network switch connection database 174, and a flow management module 304. In some embodiments, the flow management module 304 may include a flow determination module 306 and a forwarding determination module 308. Each of the modules, logic, and other components of the environment 300 may be embodied as hardware, software, firmware, or a combination thereof. For example, each of the modules, logic and other components of the environment 300 may form a portion of, or otherwise be established by, processors or other hardware components of the network controller 170. It should be appreciated that the network controller 170 may include other components, sub-components, modules, and devices commonly found in a computing device, which are not illustrated in FIG. 3 for clarity of the description.

The architecture management module 302 may be configured to receive architectural information from the computing device 110. As discussed above, the architectural information defines an architecture of each processing node 112 of the computing device 110. For example, in some embodiments, the architectural information received by the architecture management module 302 may include application data, processor data, processor core data, memory queue data, processor core application execution data, and/or port data. In the illustrative embodiment, the architecture management module 302 is configured to store or otherwise maintain the architectural information received from the computing device 110 in the computing device architecture database 172 or in any other suitable data structure for storing the architecture information.

In some embodiments, the architecture management module 302 may be configured to receive the architectural information from the computing device 110 in response to initialization of the computing device 110 or a component thereof. For example, the architecture management module 302 may be configured to receive the architectural information from the computing device 110 in response to completion of a boot process by the computing device 110 and/or in response to initialization or execution of a particular application by a processing node 112 or a processor core of a processor of the computing device 110. In another example, the architecture management module 302 may be configured to receive the architectural information from the computing device 110 based on a configurable reference architecture notification interval and/or based on one or more instructions or commands transmitted to the computing device 110 requesting that computing device 110 transmit the architectural information. In some embodiments, the architecture management module 302 may be configured to receive the architectural information from the computing device 110 as one or more Simple Object Access Protocol (SOAP) messages. Of course it should be appreciated that any other suitable messaging and/or notification protocol may be used by the architecture management module 302 to receive the architectural information from the computing device 110.

The architecture management module 302 may also be configured to receive connection information from the network switch 190. The connection information defines or is otherwise indicative of one or more network connections (e.g., communication links) between one or more ports (e.g., PA 192, PB 194, PC 196) of the network switch 190 and the computing device 110, the network controller 170, the remote computing device 180, and/or any other computing device or communication network. In some embodiments, the architecture management module 302 may be configured to receive the connection information from the network switch 190 as one or more OpenFlow messages. Additionally or alternatively, the architecture management module 302 may be configured to receive the connection information from the network switch 190 as one or more representational state transfer (REST) messages. Of course, it should be appreciated that any other suitable messaging protocol and/or format (e.g., XML-based protocols and/or formats such as Simple Object Access Protocol (SOAP), open standards-based protocols and/or formats such as JavaScript Object Notation (JSON), etc.) may be used by architecture management module 302 to receive the connection information from the network switch 190.

In some embodiments, the architecture management module 302 may be configured to receive the connection information from the network switch 190 upon establishment or termination of a network connection (e.g., communication link) between the network switch 190 and the computing device 110, the network controller 170, the remote computing device 180, and/or any other computing device or communication network. For example, the architecture management module 302 may be configured to receive the connection information in response to the network switch 190 detecting a change in the link status (e.g., "connected," "not connected," "active," "inactive," "up," "down," etc.) of one or more of the ports (e.g., PA 192, PB 194, PC 196) of the network switch 190. In some embodiments, the architecture management module 302 may be configured to receive the connection information from the network switch 190 in response to the network switch 190 detecting a new MAC address associated with a computing device (e.g., the computing device 110, the network controller 170, the remote computing device 180, and/or any other computing device) newly connected to a port (e.g., PA 192, PB 194, PC 196) of the network switch 190. Additionally or alternatively, in some embodiments, the architecture management module 302 may be configured to receive the connection information from the network switch 190 based on a configurable reference connection notification interval and/or based on one or more instructions or commands sent to the computing device 110 requesting that the computing device 110 transmit the connection information. In the illustrative embodiment, the architecture management module 302 is configured to store or otherwise maintain the connection information received from the network switch 190 in the network switch connection database 174 or in any other suitable data structure for storing the connection information.

The flow management module 304 may be configured to determine network flow information associated with the network packet received by the network switch 190. To do so, in some embodiments, the flow management module 304 includes the flow determination module 306. In such embodiments, the flow determination module 306 determines the network flow information associated with the network packet received by the network switch 190 based on the architectural information received from the computing device 110. As discussed, the architectural information received from the computing device 110 may be stored in the computing device architecture database 172. In some embodiments, the network flow information determined by the flow determination module 306 identifies or is otherwise indicative of a target processing node 112 (e.g., the processing node 114) of the computing device 110 to process the network packet based at least in part on, or otherwise as a function of, an application being executed by the target processing node 112 (e.g., the processing node 114). In such embodiments, the flow determination module 306 may determine or otherwise identify a particular application targeted by the network packet received by the network switch 190. The flow determination module 306 may compare the identified application to the architecture information stored in the computing device architecture database 172 to determine the target processing node 112 (e.g., the processing node 114) of the computing device 110 executing the identified application. In some embodiments, the flow determination module 306 may compare the identified application to the architecture information stored in the computing device architecture database 172 to determine the particular processor core (e.g., core A 122, core B 124, core A 142, or core B 144) executing the identified application. Additionally or alternatively, the flow determination module 306 may determine or otherwise identify the particular network adapter (e.g., the NIC 136) and the memory bank (e.g., the memory 126) associated with the target processing node 112 (e.g., the processing node 114) executing the identified application based on the architecture information stored in the computing device architecture database 172. After determining the network flow information associated with the network packet, the flow determination module 306 may be configured to transmit the determined network flow information to the computing device 110.

The flow management module 304 may also be configured to determine the forwarding information associated with the network packet received by the network switch 190. To do so, in some embodiments, the flow management module 304 includes the forwarding determination module 308. In such embodiments, the forwarding determination module 308 determines the forwarding information for the network packet based on the architecture information received from the computing device 110 and the connection information received from the network switch 190. As discussed, the architectural information received from the computing device 110 may be stored in the computing device architecture database 172 and the connection information received from the network switch 190 may be stored in the network switch connection database 174. In some embodiments, the forwarding information determined by the forwarding determination module 308 identifies or is otherwise indicative of a particular port (e.g., PA 192, PB 194, or PC 196) of the network switch 190 to which the received network packet should be forwarded. In such embodiments, the forwarding determination module 308 may be configured to utilize the architecture information and the connection information to determine that the network adapter (e.g., the NIC 136) of the target processing node 112 (e.g., the processing node 114) executing the application targeted by the network packet is communicatively coupled to a particular port (e.g., PA 192) of the network switch 190. After determining the forwarding information associated with the network packet, the forwarding determination module 308 may be configured to transmit the determined forwarding information to the network switch 190.

Additionally or alternatively, the flow management module 304 may be configured to transmit one or more instructions or commands to the computing device 110 instructing a particular processing node 112 (e.g., the processing node 114 or the processing node 116) and or a particular processor core (e.g., core A 122, core B 124, core A 142, or core B 144) of one of the processing nodes 112 to initialize or execute an application. In some embodiments, the flow management module 304 may transmit such instructions to the computing device 110 in response to determining that one or more network packets received by the network switch 190 are targeting an application that is not yet being executed by a processing node 112 of the computing device 110. In some embodiments, the flow management module 304 may determine the particular processing node 112 (e.g., the processing node 114 or the processing node 116) and/or the particular processor core (e.g., core A 122, core B 124, core A 142, or core B 144) of one of the processing nodes 112 being utilized least. That is, the flow management module 304 may determine the particular processor core and/or one of the processing nodes 112 having the most resources and/or the greatest processing capacity. In such embodiments, the instructions and/or commands transmitted by the flow management module 304 may instruct the computing device 110 to initialize or otherwise execute the new application on the particular processing node 112 (e.g., the processing node 114 or the processing node 116) and/or the particular processor core (e.g., core A 122, core B 124, core A 142, or core B 144) determined to have the most resources and/or the greatest processing capacity.

Figure 4:
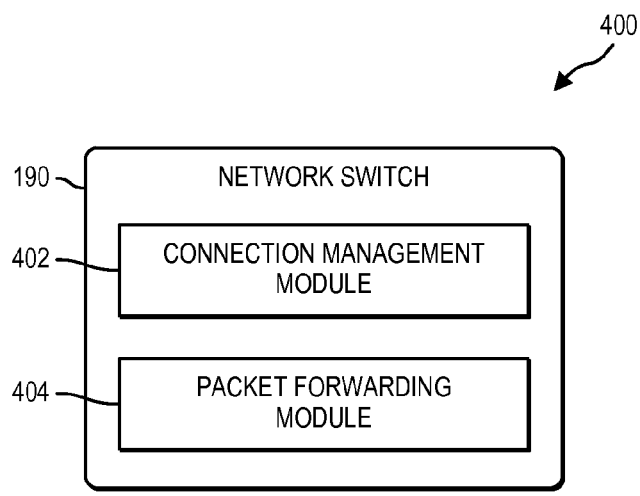
FIG. 4 is a simplified block diagram of at least one embodiment of an environment of a network switch of the system of FIG. 1.

Referring now to FIG. 4, in use, the network switch 190 establishes an environment 400 during operation. The illustrative environment 400 includes a connection management module 402 and a packet forwarding module 404. Each of the modules, logic, and other components of the environment 400 may be embodied as hardware, software, firmware, or a combination thereof. For example, each of the modules, logic and other components of the environment 400 may form a portion of, or otherwise be established by, processors or other hardware components of the network switch 190. It should be appreciated that the network switch 190 may include other components, sub-components, modules, and devices commonly found in a computing device, which are not illustrated in FIG. 4 for clarity of the description.

The connection management module 402 may be configured to transmit connection information to the network controller 170. The connection information defines or is otherwise indicative of one or more network connections (e.g., communication links) between one or more ports (e.g., PA 192, PB 194, PC 196) of the network switch 190 and the computing device 110, the network controller 170, the remote computing device 180, and/or any other computing device or communication network. In some embodiments, the connection management module 402 may be configured to transmit the connection information to the network controller 170 as one or more OpenFlow messages. Additionally or alternatively, the connection management module 402 may be configured to transmit the connection information to the network controller 170 as one or more representational state transfer (REST) messages. Of course, it should be appreciated that any other suitable messaging protocol and/or format (e.g., XML-based protocols and/or formats such as Simple Object Access Protocol (SOAP), open standards-based protocols and/or formats such as JavaScript Object Notation (JSON), etc.) may be used by the connection management module 402 to transmit the connection information to the network controller 170.

In some embodiments, the connection management module 402 may be configured to transmit the connection information to the network controller 170 upon establishment or termination of a network connection (e.g., a communication link) between the network switch 190 and the computing device 110, the network controller 170, the remote computing device 180, and/or any other computing device or communication network. For example, the connection management module 402 may be configured to transmit the connection information in response to detecting a change in the link status (e.g., "connected," "not connected," "active," "inactive," "up," "down," etc.) of one or more of the ports (e.g., PA 192, PB 194, PC 196) of the network switch 190. In some embodiments, the connection management module 402 may be configured to transmit the connection information to the network controller 170 in response to detecting a new MAC address associated with a computing device (e.g., the computing device 110, the network controller 170, the remote computing device 180, and/or any other computing device) newly connected to a port (e.g., PA 192, PB 194, PC 196) of the network switch 190. Additionally or alternatively, in some embodiments, the connection management module 402 may be configured to transmit the connection information to the network controller 170 based on a configurable reference connection notification interval and/or based on one or more instructions or commands received from the network controller 170 requesting that the connection management module 402 transmit the connection information.

The packet forwarding module 404 may be configured to receive a network packet from a remote computing device 180 via a port (e.g., PA 192, PB 194, or PC 196) of the network switch 190. In response to receiving the network packet from the remote computing device 180, the packet forwarding module 404 is configured to transmit a request for forwarding information associated with the received network packet to the network controller 170. The packet forwarding module 404 may also be configured to receive the requested forwarding information from the network controller 170. The forwarding information may identify or otherwise be indicative of the network adapter (e.g., the NIC 136 or the NIC 156) of the particular processing node 112 of the computing device 110 to which the received network packet should be forwarded. In some embodiments, the forwarding information may include information indicative of the particular interface or port (e.g., PA 192, PB 194, PC 196) of the network switch 190 communicatively coupled to the identified network adapter (e.g., the NIC 136 or the NIC 156) of the computing device 110. Additionally, in some embodiments, the packet forwarding module 404 may be configured to maintain one or more flow tables including one or more flow entries. In such embodiments, the packet forwarding module 404 may be configured to add flow entries to the forwarding table(s) based on the forwarding information received from the network controller 170.

The packet forwarding module 404 may also be configured to forward the network packet received by the remote computing device 180 to the network adapter (e.g., the NIC 136 or the NIC 156) of the particular processing node 112 of the computing device 110 identified by the network controller 170 based on the received forwarding information. To do so, in some embodiments, the packet forwarding module 404 may be configured to forward the network packet from the port (e.g., PB 194) of the network switch 190 that the network packet was received to another port (e.g., PA 192) of the network switch 190 communicatively coupled to the identified network adapter (e.g., the NIC 136 or the NIC 156) of the computing device 110 based on the forwarding information received from the network controller 170. In embodiments in which the network switch 190 maintains flow table(s) including one or more flow entries, the packet forwarding module 404 may be configured to forward the network packet received by the remote computing device 180 to the network adapter (e.g., the NIC 136 or the NIC 156) of the particular processing node 112 of the computing device 110 identified by the network controller 170 based on the one or more flow entries of the flow table(s).

Figure 5:
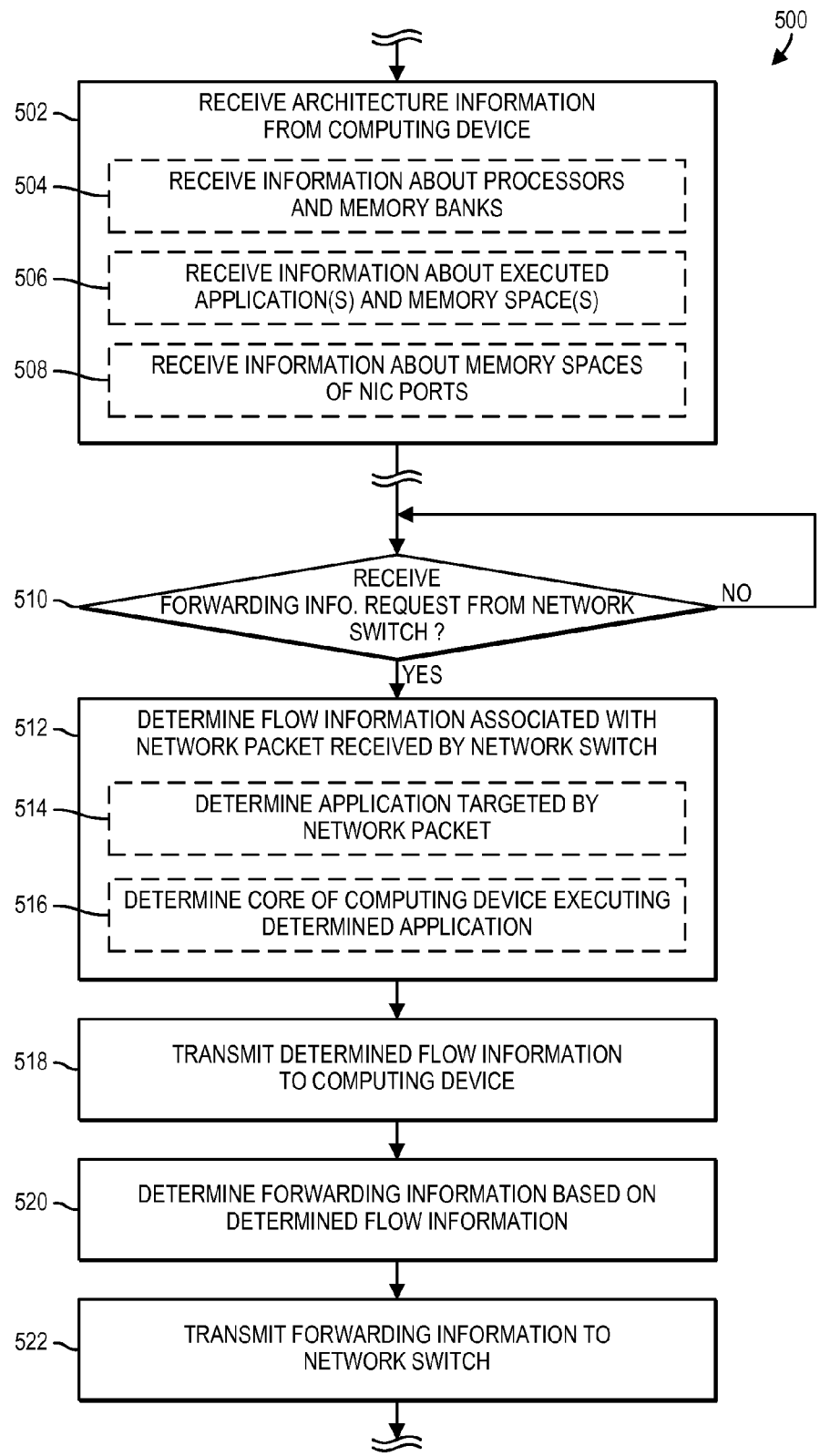
FIG. 5 is a simplified flow diagram of at least one embodiment of a method for aligning network flows to processing resources that may be executed by the network controller of FIGS. 1 and 3.

Referring now to FIG. 5, the network controller 170 may execute a method 500 for aligning network flows to processing resources of the computing device 110. The method 500 begins with block 502 in which the network controller 170 receives architectural information from the computing device 110. As discussed above, the architectural information may define an architecture of each processing node 112 of the computing device 110. For example, in some embodiments, in block 504, the network controller 170 receives architectural information from the computing device 110 indicative of which processors (e.g., the processor 120 and the processor 140) and memory banks (e.g., the memory 126 and the memory 146) are included within which processing nodes 112 (e.g., the processing node 114 and the processing node 116) of the computing device 110. In some embodiments, the architectural information may also include information identifying which processor cores (e.g., core A 122, core B 124, core A 142, and core B 144) are included in which processors (e.g., the processor 120 and the processor 140). Additionally, in block 506, the network controller 170 receives architectural information from the computing device 110 indicative of which applications are being executed by which processing nodes 112 (e.g., the processing node 114 and the processing node 116) of the computing device 110. In some embodiments, such architectural information may also identify which processor cores (e.g., core A 122, core B 124, core A 142, or core B 144) of the processors (e.g., the processor 120 and the processor 140) are executing which applications. Additionally or alternatively, the received architectural information may include information identifying the memory spaces (e.g., the application memory space 128 and the application memory space 148) assigned to or otherwise allocated to each application being executed. In some embodiments, in block 508, the network controller 170 may also receive architectural information from the computing device 110 indicative of which memory queues (e.g., Q0 132, Q1 134, Q2 152, and Q3 154) are assigned to or otherwise allocated to which ports (e.g., P1 137 or P2 157) of which network adapter (e.g., the NIC 136 or the NIC 156). Of course it should be appreciated that the network controller 170 may receive any other type of architectural information from the computing device 110 in other embodiments.

In decision block 510, the network controller 170 determines whether a request for forwarding information is received from the network switch 190. The request for forwarding information may be received from the network switch 190 in response to the network switch 190 receiving a network packet from the remote computing device 180 via a port (e.g., PA 192, PB 194, PC 196) of the network switch 190. If, in decision block 510, the network controller 170 determines that a request for forwarding information is received from the network switch 190, the method 500 advances to block 512. If, however, the network controller 170 determines instead that a request for forwarding information is not received from the network switch 190, the method 500 loops back to decision block 510 and the network controller 170 continues determining whether a request for forwarding information is received.

In block 512, the network controller 170 determines network flow information associated with the network packet received by the network switch 190. The network flow information identifies or is otherwise indicative of a target processing node 112 (e.g., the processing node 114) of the computing device 110 to process the network packet based at least in part on, or otherwise as a function of, an application executed by the target processing node. In operation, the network controller 170 determines the network flow information based on the architecture information received from the computing device 110 and maintained in the computing device architecture database 172. As such, in some embodiments, the network controller 170 in block 514 may determine or otherwise identify the particular application targeted by the network packet received by the network switch 190. To do so, the network controller 170 may examine header information (e.g., a port number and type from a 5-tuple) associated with the network packet to determine the targeted application. Of course, it should be appreciated that the network controller 170 may use any other process for determining or identifying the particular application targeted by the network packet received by the network switch 190. In such embodiments, the network controller 170 may compare the determined application to the architecture information received from the computing device 110 to determine the network flow information. For example, in some embodiments, the network controller 170 may determine that the application targeted by the received network packet is being executed by a particular processing node 112 (e.g., the processing node 114) of the computing device 110. In such embodiments, network controller 170 may determine that the particular processing node 112 (e.g., the processing node 114) of the computing device 110 executing the application targeted by the received network packet is the target processing node 112. Additionally, in some embodiments, the network controller 170 in block 516 may also determine the particular processor core (e.g., core A 122, core B 124, core A 142, or core B 144) executing the application targeted by the network packet. In such embodiments, network controller 170 may determine that the particular processing node 112 (e.g., the processing node 114) of the computing device 110 including the processor core (e.g., core A 122 or core B 124) executing the application targeted by the received network packet is the target processing node 112.

In block 518, the network controller 170 transmits the network flow information to the computing device 110. The network flow information may then be used by the computing device 110 to program a flow filter (e.g., the flow filter 138) in the network adapter (e.g., the NIC 136) of the particular target processing node 112 (e.g., the processing node 114) executing the application targeted by the network packet. In some embodiments, the flow filter (e.g., the flow filter 138) in the network adapter (e.g., the NIC 136) of the particular target processing node 112 (e.g., the processing node 114) specifies a memory queue (e.g., Q0 132 or Q1 134) in the memory (e.g., the memory 126) of the target processing node 112 (e.g., the processing node 114) to receive the network packet (and subsequent related network packets) received by the network switch 190.

In block 520, the network controller 170 determines the forwarding information associated with the network packet received by the network switch 190. The forwarding information identifies a particular port (e.g., PA 192, PB 194, or PC 196) of the network switch 190 to which the received network packet should be forwarded. In operation, the network controller 170 determines the forwarding information based on the architecture information received from the computing device 110 and maintained in the computing device architecture and/or the connection information received from the network switch 190 and maintained in the network switch connection database 174. For example, in some embodiments, the network controller 170 may utilize the architecture information and the connection information to determine that the network adapter (e.g., the NIC 136) of the target processing node 112 (e.g., the processing node 114) executing the application targeted by the network packet is communicatively coupled to a particular port (e.g., PA 192) of the network switch 190.

In block 522, the network controller transmits the forwarding information to the network switch 190. The forwarding information may then be used by network switch 190 to forward the received network packet to the particular port (e.g., PA 192) communicatively coupled to the network adapter (e.g., the NIC 136) of the target processing node 112 (e.g., the processing node 114) executing the application targeted by the received network packet.

Figure 6:
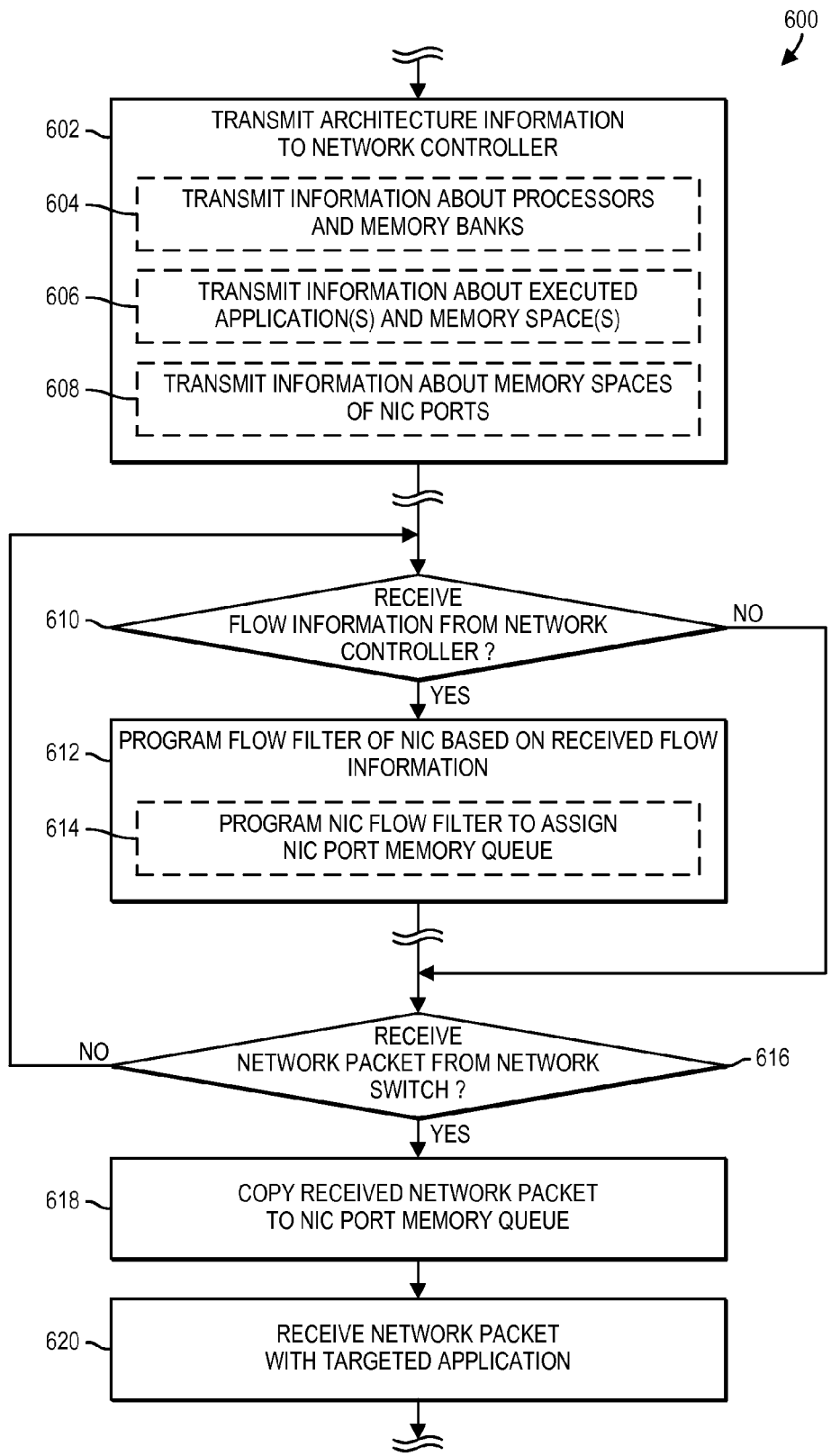
FIG. 6 is a simplified flow diagram of at least one embodiment of a method for aligning network flows to processing resources that may be executed by the computing device of FIGS. 1 and 2.

Referring now to FIG. 6, the computing device 110 may execute a method 600 for aligning network flows to processing resources of the computing device 110. The method 600 begins with block 602 in which the computing device 110 transmits architectural information to the network controller 170. Again, as discussed above, the architectural information may define an architecture of each processing node 112 of the computing device 110. For example, in some embodiments, in block 604, the computing device 110 transmits architectural information to the network controller 170 indicative of which processors and memory banks are included within which processing nodes 112 of the computing device 110. In some embodiments, the architectural information may also include information identifying which processor cores are included in which processors. Additionally, in block 606, the computing device 110 transmits architectural information to the network controller 170 indicative of which applications are being executed by which processing nodes 112 of the computing device 110. In some embodiments, such architectural information may also identify which processor cores of the processors are executing which applications. Additionally or alternatively, the transmitted architectural information may include information identifying the memory spaces assigned or otherwise allocated to each application being executed. In some embodiments, in block 608, the computing device 110 may also transmit architectural information to the network controller 170 indicative of which memory queues are assigned or otherwise allocated to which ports of which network adapter (e.g., NIC). Of course it should be appreciated that the computing device 110 may transmit any other type of architectural information to the network controller 170 in other embodiments.

In decision block 610, the computing device 110 determines whether network flow information associated with the network packet received by the network switch 190 is received from the network controller 170. In some embodiments, the network information may be received via one or more management ports (not shown) of the computing device 110 that communicatively couple the computing device 110 to the network controller 170. The network flow information identifies or is otherwise indicative of a target processing node 112 (e.g., the processing node 114) of the computing device 110 to process the network packet based at least in part on, or otherwise as a function of, an application executed by the target processing node 112. In some embodiments, the network flow information may also identify or otherwise be indicative of a particular processor core (e.g., core A 122, core B 124) executing an application targeted by the network packet. If, in decision block 610, the computing device 110 determines that network flow information associated with the network packet is received from the network controller 170, the method 600 advances to block 612. If, however, the computing device 110 determines instead that network flow information associated with the network packet is not received from the network controller 170, the method 600 advances to decision block 616.

In block 612, the computing device 110 programs a flow filter (e.g., the flow filter 138) in the network adapter (e.g., the NIC 136) of the target processing node 112 (e.g., the processing node 114) executing the application targeted by the network packet. In some embodiments, in block 614, the computing device 110 programs the flow filter (e.g., the flow filter 138) in the network adapter (e.g., the NIC 136) of the target processing node 112 (e.g., the processing node 114) to specify a memory queue (e.g., Q0 132 or Q1 134) in the memory (e.g., the memory 126) of the target processing node 112 (e.g., the processing node 114) to receive the network packet (and subsequent related network packets) received by the network switch 190.

In decision block 616, the computing device 110 determines whether the network packet is received from the network switch 190. To do so, in some embodiments, the computing device 110 determines whether the network packet is received by the network adapter (e.g., the NIC 136) of the target processing node 112 (e.g., the processing node 114). If, in decision block 616, the computing device 110 determines that the network packet is received from the network switch 190, the method 600 advances to block 618. If, however, the computing device 110 determines instead that the network packet is not received from the network switch 190, the method 600 loops back to decision block 610 and the computing device 110 determines whether network flow information is received.

In block 618, the network adapter (e.g., the NIC 136) of the target processing node 112 (e.g., the processing node 114) copies the received network packet to the specified memory queue (e.g., Q0 132 or Q1 134) in the memory (e.g., the memory 126) of the target processing node 112. To do so, the network adapter (e.g., the NIC 136) of the target processing node 112 applies the previously programmed flow filter (e.g., the flow filter 138) to the network packet received from the network switch 190. In embodiments in which the computing device 110 determines that a network packet is received but that the network flow information associated with the network packet is not received, the network adapter (e.g., the NIC 136 or the NIC 156) that received the network packet copies the received network packet to a memory queue (e.g., Q0 132, Q1 134, Q2 152, or Q3 154) in the NIC memory space (e.g., the NIC memory space 130 or the NIC memory space 150) associated therewith.

In block 620, the particular application targeted by the network packet receives or otherwise retrieves the network packet from the specified memory queue (e.g., Q0 132 or Q1 134) in the memory (e.g., the memory 126) of the target processing node 112 (e.g., the processing node 114). In some embodiments, the targeted application may determine whether the network packet is available for retrieval from the specified memory queue (e.g., Q0 132 or Q1 134). To do so, in some embodiments, the targeted application may poll the specified memory queue (e.g., Q0 132 or Q1 134) to determine whether the network packet is available for retrieval. Additionally or alternatively, the targeted application may receive an interrupt generated by another component of the computing device 110 indicating that the network packet is available to be retrieved from the specified memory queue (e.g., Q0 132 or Q1 134). In such embodiments, the targeted application may retrieve the network packet from the specified memory queue (e.g., Q0 132 or Q1 134) in response to determining that the network packet is available for retrieval. In some embodiments, the targeted application clears or otherwise resets the specified memory queue (e.g., Q0 132 or Q1 134) after retrieving the network packet. In embodiments in which the computing device 110 determines that a network packet is received but that the network flow information associated with the network packet is not received, the particular application targeted by the network packet receives or otherwise retrieves the network packet from the memory queue (e.g., Q0 132, Q1 134, Q2 152, or Q3 154) in the memory (e.g., the memory 126 or the memory 146) of the processing node 112 (e.g., the processing node 114 or the processing node 116) within which the network packet is stored. It should be appreciated that in some embodiments, the particular application targeted by the network packet may be executed in a different processing node 112 (e.g., the processing node 114) than the processing node 112 (e.g., the processing node 116) including the NIC memory space (e.g., the NIC memory space 150) storing the received network packet. In such embodiments, the targeted application may receive or otherwise retrieve the network packet from the NIC memory space (e.g., the NIC memory space 150) of the processing node 112 (e.g., the processing node 116) via a communication link (e.g., QPI 118, etc.) that communicatively couples the processing node 114 to the processing node 116.

Figure 7:
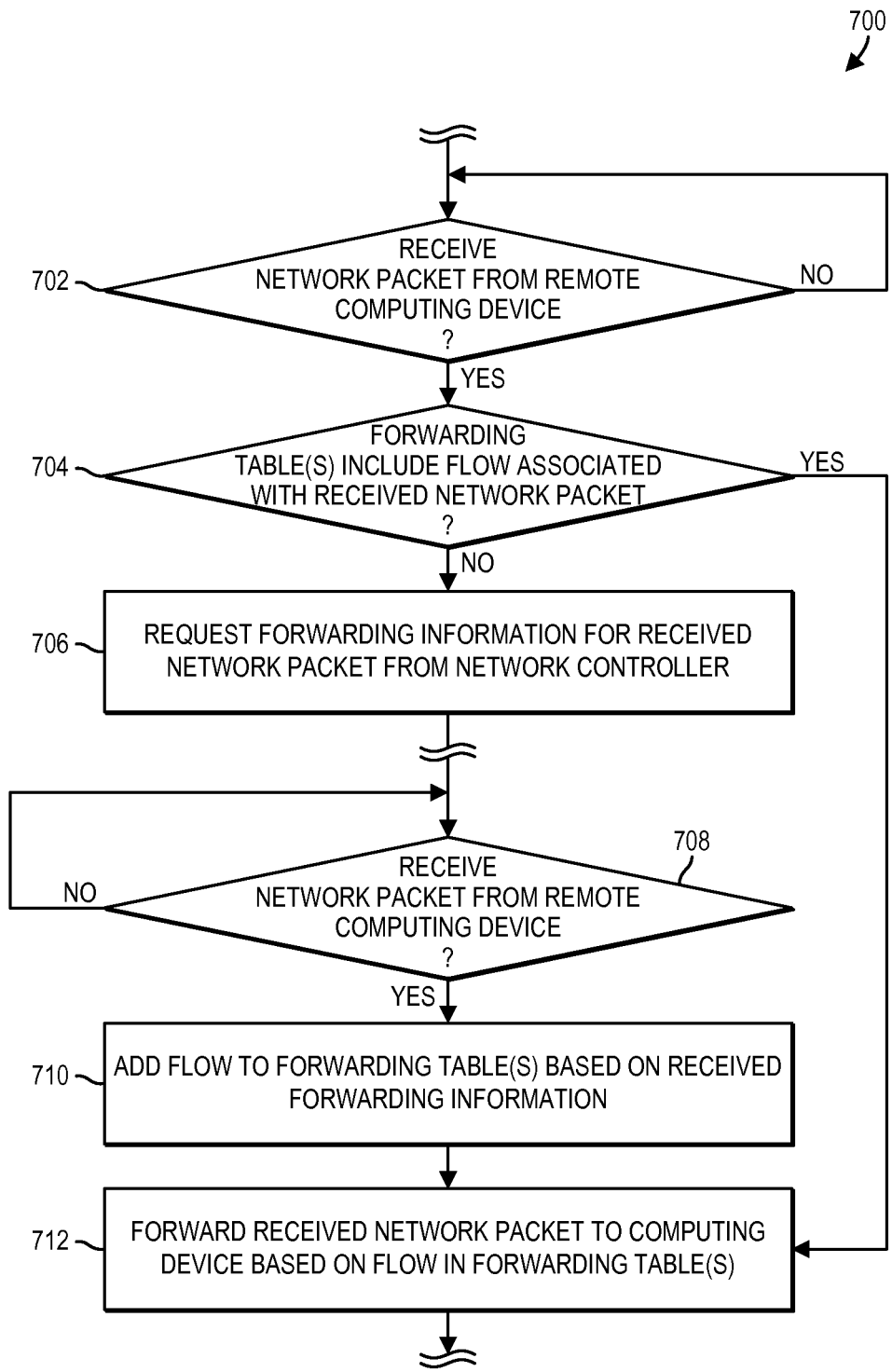
FIG. 7 is a simplified flow diagram of at least one embodiment of a method for aligning network flows to processing resources that may be executed by the network switch of FIGS. 1 and 4.

Referring now to FIG. 7, the network switch 190 may execute a method 700 for aligning network flows to processing resources of the computing device 110. The method 700 begins with decision block 702 in which the network switch 190 determines whether a network packet is received from the remote computing device 180. In some embodiments, the network switch 190 determines whether a network packet is received from the remote computing device 180 via a port (e.g., PA 192, PB 194, PC 196) of the network switch 190. If, in decision block 702, the network switch 190 determines that a network packet is received from the remote computing device 180, the method 700 advances to block 704. If, however, the network switch 190 determines instead that a network packet is not received from the remote computing device 180, the method 700 loops back to decision block 702 and the network switch 190 continues determining whether a network packet is received.

In decision block 704, the network switch 190 may determine whether the forwarding table(s) maintained by the network switch 190 include a flow entry associated with the with the received network packet. As discussed, each flow entry of the flow table(s) may be based on forwarding information received from the network controller 170 and may be used by the network switch 190 to identify one or more network flows, the network packets associated with each network flow, and a destination computing device (or a component thereof) to which the network packets of each network flow should be forwarded. If, in decision block 704, the network switch 190 determines that the forwarding table(s) include a flow entry associated with the received network packet, the method 700 advances to block 712. If, however, the network switch 190 determines instead that the forwarding table(s) do not include a flow entry associated with the received network packet, the method 700 advances to block 706.

In block 706, the network switch 190 requests forwarding information associated with the received network packet from the network controller 170. In some embodiments, the forwarding information identifies a particular port (e.g., PA 192, PB 194, or PC 196) of the network switch 190 to which the received network packet should be forwarded. For example, in some embodiments, the forwarding information may identify a particular port (e.g., PA 192) communicatively coupled to a specific network adapter (e.g., the NIC 136) of a target processing node 112 (e.g., the processing node 114) of the computing device 110 to which the received network packet should be forwarded.

In decision block 708, the network switch 190 determines whether the requested forwarding information for the network packet is received from the network controller 170. If, in decision block 708, the network switch 190 determines that the forwarding information for the network packet is received from the network controller 170, the method 700 advances to block 710. If, however, the network switch 190 determines instead that the forwarding information for the network packet is not received from the network controller 170, the method 700 loops back to decision block 708 and the network switch 190 continues determining whether the requested forwarding information for the network packet is received.

In block 710, the network switch adds a flow entry to the forwarding table(s) maintained by the network switch 190 based on the forwarding information received from the network controller 170. The flow entry added to the flow table(s) may identify a network flow, the network packets associated with the network flow, and a destination computing device (or a component thereof) to which the network packets of each network flow should be forwarded. For example, in some embodiments, the flow entry added to the flow table(s) may be indicative of the particular port (e.g., PA 192, PB 194, PC 196) of the network switch 190 communicatively coupled to the computing device 110 (or a particular component thereof such as the NIC 136) and to which the received network packet (and subsequently received network packets) should be forwarded.

In block 712, the network switch 190 forwards the network packet based on the flow entry of the forwarding table(s) associated with the received network packet. For example, in some embodiments, the network switch 190 may forward a network packet received from the remote computing device 180 via one port (e.g., PB 194) of the network switch 190 to a different port (e.g., PA 192) of the network switch 190 based on the flow entry of the forwarding table(s) associated with the received network packet.

Figure 8:
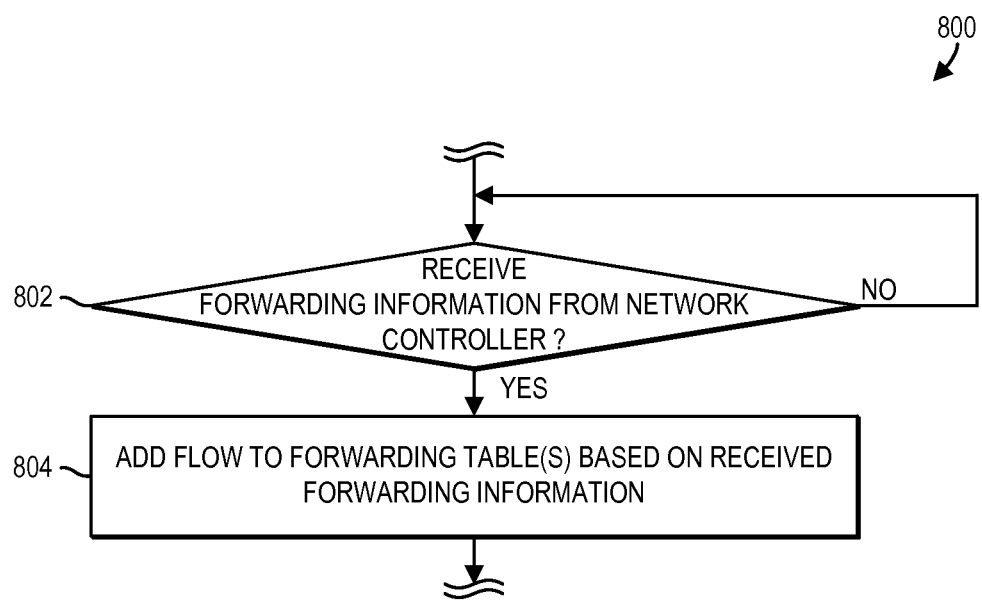
FIG. 8 is a simplified flow diagram of at least one other embodiment of a method for aligning network flows to processing resources that may be executed by the network switch of FIGS. 1 and 4.

Referring now to FIG. 8, the network switch 190 may execute a method 800 for aligning network flows to processing resources of the computing device 110. In some embodiments, the network switch 190 may execute the method 800 in parallel with the method 700 discussed above. The method 800 begins with decision block 802 in which the network switch 190 determines whether forwarding information for a network packet is received from the network controller 170. If, in decision block 802, the network switch 190 determines that forwarding information for a network packet is received from the network controller 170, the method 800 advances to block 804. If, however, the network switch 190 determines instead that forwarding information for a network packet is not received from the network controller 170, the method 800 loops back to decision block 802 and the network switch 190 continues determining whether forwarding information is received.

In block 804, the network switch 190 adds a flow entry to the forwarding table(s) maintained by the network switch 190 based on the forwarding information received from the network controller 170. The flow entry added to the flow table(s) may identify a network flow, the network packets associated with the network flow, and a destination computing device (or a component thereof) to which the network packets of each network flow should be forwarded. For example, in some embodiments, the flow entry added to the flow table(s) may be indicative of the particular port (e.g., PA 192, PB 194, PC 196) of the network switch 190 communicatively coupled to the computing device 110 and to which the received network packet (and subsequently received network packets) should be forwarded.

EXAMPLES

Illustrative examples of the technologies disclosed herein are provided below. An embodiment of the technologies may include any one or more, and any combination of, the examples described below.

Example 1 includes a computing device for alignment of network flows to processing resources, the computing device including an architecture notification module to transmit architectural information to a network controller, the architectural information defining an architecture of each processing node of a plurality of processing nodes of the computing device, wherein each processing node includes a processor, a memory, and a network adapter; a local flow management module to (i) receive network flow information from the network controller, wherein the network flow information is associated with a network packet and identifies a target processing node of the plurality of processing nodes to process the network packet based at least on an application executed by the target processing node and (ii) program a flow filter in the network adapter of the target processing node based at least on the network flow information to specify a memory queue in the memory of the target processing node to receive the network packet; and wherein the network adapter of the target processing node to receive the network packet from a network switch, the network packet to be processed by the application executed by the target processing node.

Example 2 includes the subject matter of Example 1, and wherein the architectural information is indicative of applications executed by each processing node of the plurality of processing nodes.

Example 3 includes the subject matter of any of Examples 1 and 2, and wherein the processor of each processing node includes a plurality of processing cores; wherein the architectural information includes data indicative of the applications executed by each processing core of each processor of each processing node; and wherein to receive the network flow information includes to receive network flow information from the network controller that identifies the target processing node to process the network packet based at least on an application executed by a processing core of the target processing node.

Example 4 includes the subject matter of any of Examples 1-3, and wherein the network adapter of the target processing node is further to (i) allocate the memory queue in the memory of the target processing node to a port of the network adapter, wherein to receive the network packet from the network switch includes to receive the network packet from the network switch via the port of the network adapter and (ii) copy the received network packet to the memory queue in the memory of the target processing node allocated to the port of the network adapter.

Example 5 includes the subject matter of any of Examples 1-4, and wherein the application executed by the target processing node is to (i) determine whether the received network packet is available to be retrieved from the memory queue in the memory of the target processing node and (ii) retrieve the received network packet from the memory queue in the memory of the target processing node in response to a determination that the received network packet is available to be retrieved from the memory queue.

Example 6 includes the subject matter of any of Examples 1-5, and wherein to determine whether the network packet is available to be retrieved from the memory queue includes at least one of (i) poll the memory queue in the memory of the target processing node as a function of a reference polling interval or (ii) receive an interrupt that indicates that the network packet is available to be retrieved from the memory queue.

Example 7 includes the subject matter of any of Examples 1-6, and wherein the network packet includes a first network packet, the network flow information includes first network flow information, the flow filter includes a first flow filter, the memory of the target processing node includes a first memory, the memory queue in the memory of the target processing node includes a first memory queue in the first memory of the target processing node, and the network adapter of the target processing node includes a first network adapter of the target processing node; wherein the local flow management module is further to (i) receive second network flow information from the network controller, wherein the second network flow information is associated with a second network packet and identifies a different processing node of the plurality of processing nodes to process the second network packet based at least on another application executed by the different processing node and (ii) program a second flow filter in a second network adapter of the different processing node based at least on the second network flow information to specify a second memory queue in a second memory of the different processing node to receive the second network packet; and wherein the second network adapter of the different processing node to receive the second network packet from the network switch, the second network packet to be processed by the another application executed by the different processing node.

Example 8 includes the subject matter of any of Examples 1-7, and wherein the target processing node to execute another application based at least on instructions received from the network controller.

Example 9 includes a method for aligning network flows to processing resources, the method including transmitting, by a computing device having a plurality of processing nodes, architectural information to a network controller, the architectural information defining an architecture of each processing node, wherein each processing node includes a processor, a memory, and a network adapter; receiving, by the computing device, network flow information from the network controller, wherein the network flow information is associated with a network packet and identifies a target processing node of the plurality of processing nodes to process the network packet based at least on an application executed by the target processing node; programming, by the computing device, a flow filter in the network adapter of the target processing node based at least on the network flow information to specify a memory queue in the memory of the target processing node to receive the network packet; and receiving, by the network adapter of the target processing node, the network packet from a network switch, the network packet to be processed by the application executed by the target processing node.

Example 10 includes the subject matter of Example 9, and wherein the architectural information is indicative of applications executed by each processing node of the plurality of processing nodes.

Example 11 includes the subject matter of any of Examples 9 and 10, and wherein the processor of each processing node includes a plurality of processing cores; wherein the architectural information includes data indicative of the applications executed by each processing core of each processor of each processing node; and wherein receiving the network flow information includes receiving network flow information from the network controller that identifies the target processing node to process the network packet based at least on an application executed by a processing core of the target processing node.

Example 12 includes the subject matter of any of Examples 9-11, and further including allocating, by the network adapter of the target processing node, the memory queue in the memory of the target processing node to a port of the network adapter, wherein receiving the network packet from the network switch includes receiving the network packet from the network switch via the port of the network adapter; and copying, by the network adapter of the target processing node, the received network packet to the memory queue in the memory of the target processing node allocated to the port of the network adapter.

Example 13 includes the subject matter of any of Examples 9-12, and further including determining, by the application executed by the target processing node, whether the received network packet is available to be retrieved from the memory queue in the memory of the target processing node; and retrieving, by the application executed by the target processing node, the received network packet from the memory queue in the memory of the target processing node in response to a determination that the received network packet is available to be retrieved from the memory queue.

Example 14 includes the subject matter of any of Examples 9-13, and wherein determining whether the network packet is available to be retrieved from the memory queue includes at least one of (i) polling the memory queue in the memory of the target processing node as a function of a reference polling interval or (ii) receiving an interrupt that indicates that the network packet is available to be retrieved from the memory queue.

Example 15 includes the subject matter of any of Examples 9-14, and wherein the network packet includes a first network packet, the network flow information includes first network flow information, the flow filter includes a first flow filter, the memory of the target processing node includes a first memory, the memory queue in the memory of the target processing node includes a first memory queue in the first memory of the target processing node, and the network adapter of the target processing node includes a first network adapter of the target processing node; and further including receiving, by the computing device, second network flow information from the network controller, wherein the second network flow information is associated with a second network packet and identifies a different processing node of the plurality of processing nodes to process the second network packet based at least on another application executed by the different processing node; programming, by the computing device, a second flow filter in a second network adapter of the different processing node based at least on the second network flow information to specify a second memory queue in a second memory of the different processing node to receive the second network packet; and receiving, by the second network adapter of the different processing node, the second network packet from the network switch, the second network packet to be processed by the another application executed by the different processing node.

Example 16 includes the subject matter of any of Examples 9-15, and further including executing, by one or more of the plurality of processing nodes of the computing device, another application based at least on instructions received from the network controller.

Example 17 includes a computing device for alignment of network flows to processing resources, the computing device including a processor; and a memory having stored therein a plurality of instructions that when executed by the processor cause the computing device to perform the method of any of Examples 9-16.

Example 18 includes one or more machine-readable media including a plurality of instructions stored thereon that in response to being executed result in a computing device performing the method of any of Examples 9-16.

Example 19 includes a computing device for alignment of network flows to processing resources, the computing device including means for transmitting architectural information to a network controller, the architectural information defining an architecture of each processing node of a plurality of processing nodes of the computing device, wherein each processing node includes a processor, a memory, and a network adapter; means for receiving network flow information from the network controller, wherein the network flow information is associated with a network packet and identifies a target processing node of the plurality of processing nodes to process the network packet based at least on an application executed by the target processing node; means for programming a flow filter in the network adapter of the target processing node based at least on the network flow information to specify a memory queue in the memory of the target processing node to receive the network packet; and means for receiving, by the network adapter of the target processing node, the network packet from a network switch, the network packet to be processed by the application executed by the target processing node.

Example 20 includes the subject matter of Example 19, and wherein the architectural information is indicative of applications executed by each processing node of the plurality of processing nodes.

Example 21 includes the subject matter of any of Examples 19 and 20, and wherein the processor of each processing node includes a plurality of processing cores; wherein the architectural information includes data indicative of the applications executed by each processing core of each processor of each processing node; and wherein the means for receiving the network flow information includes means for receiving network flow information from the network controller that identifies the target processing node to process the network packet based at least on an application executed by a processing core of the target processing node.

Example 22 includes the subject matter of any of Examples 19-21, and further including means for allocating, by the network adapter of the target processing node, the memory queue in the memory of the target processing node to a port of the network adapter, wherein receiving the network packet from the network switch includes receiving the network packet from the network switch via the port of the network adapter; and means for copying, by the network adapter of the target processing node, the received network packet to the memory queue in the memory of the target processing node allocated to the port of the network adapter.

Example 23 includes the subject matter of any of Examples 19-22, and further including means for determining, by the application executed by the target processing node, whether the received network packet is available to be retrieved from the memory queue in the memory of the target processing node; and means for retrieving, by the application executed by the target processing node, the received network packet from the memory queue in the memory of the target processing node in response to a determination that the received network packet is available to be retrieved from the memory queue.

Example 24 includes the subject matter of any of Examples 19-23, and wherein the means for determining whether the network packet is available to be retrieved from the memory queue includes at least one of (i) means for polling the memory queue in the memory of the target processing node as a function of a reference polling interval or (ii) means for receiving an interrupt that indicates that the network packet is available to be retrieved from the memory queue.

Example 25 includes the subject matter of any of Examples 19-24, and wherein the network packet includes a first network packet, the network flow information includes first network flow information, the flow filter includes a first flow filter, the memory of the target processing node includes a first memory, the memory queue in the memory of the target processing node includes a first memory queue in the first memory of the target processing node, and the network adapter of the target processing node includes a first network adapter of the target processing node; and further including means for receiving second network flow information from the network controller, wherein the second network flow information is associated with a second network packet and identifies a different processing node of the plurality of processing nodes to process the second network packet based at least on another application executed by the different processing node; means for programming a second flow filter in a second network adapter of the different processing node based at least on the second network flow information to specify a second memory queue in a second memory of the different processing node to receive the second network packet; and means for receiving, by the second network adapter of the different processing node, the second network packet from the network switch, the second network packet to be processed by the another application executed by the different processing node.

Example 26 includes the subject matter of any of Examples 19-25, and further including means for executing, by one or more of the plurality of processing nodes of the computing device, another application based at least on instructions received from the network controller.

Example 27 includes a network controller for alignment of network flows to processing resources, the network controller including an architecture management module to receive architectural information from a computing device, the architectural information defining an architecture of each of a plurality of processing nodes of the computing device; and a flow management module to (i) receive, from a network switch, a request for forwarding information associated with a network packet, (ii) determine network flow information associated with the network packet based at least on the architectural information, wherein the network flow information identifies a target processing node of the plurality of processing nodes of the computing device to process the network packet based at least on an application executed by the target processing node, (iii) transmit the determined network flow information to the computing device to program a flow filter in a network adapter of the target processing node based at least on the network flow information, wherein the flow filter specifies a memory queue in a memory of the target processing node to receive the network packet, (iv) determine the forwarding information associated with the network packet, wherein the forwarding information identifies a port of the network switch communicatively coupled to the network adapter of the target processing node of the computing device and to which the network packet is to be forwarded, and (v) transmit the determined forwarding information to the network switch, the network packet to be forwarded by the network switch based at least on the forwarding information.

Example 28 includes the subject matter of Example 27, and wherein to receive the architectural information from the computing device includes to receive at least one of application data indicative of applications executed by each processing node, processor data indicative of a processor of each of the processing nodes, processor core data indicative of processing cores of the processor of each of the processing nodes, memory queue data indicative of allocated memory queues in each of the processing nodes, or port data indicative of ports of network adapters of each of the processing nodes.

Example 29 includes the subject matter of any of Examples 27 and 28, and wherein to receive the architectural information from the computing device includes to receive application execution data indicative of applications executed by each processing core of a processor of each of the processing nodes; and wherein to determine the network flow information includes to determine network flow information associated with the network packet based at least on the application execution data, wherein the network flow information identifies the target processing node of the plurality of processing nodes of the computing device to process the network packet based at least on an application executed by a processing core of the target processing node.

Example 30 includes the subject matter of any of Examples 27-29, and wherein the forwarding information includes first forwarding information, the request for forwarding information includes a request for the first forwarding information, the network packet includes a first network packet, the network flow information includes first network flow information, the flow filter includes a first flow filter, the memory of the target processing node includes a first memory, the memory queue in the memory of the target processing node includes a first memory queue in the first memory of the target processing node, and the network adapter of the target processing node includes a first network adapter of the target processing node; and wherein the flow management module is further to (i) receive, from the network switch, a second request for second forwarding information associated with a second network packet, (ii) determine second network flow information associated with the second network packet based at least on the architectural information, wherein the second network flow information identifies a different processing node of the plurality of processing nodes of the computing device to process the second network packet based at least on another application executed by the different processing node, (iii) transmit the determined second network flow information to the computing device to program a second flow filter in a second network adapter of the different processing node based at least on the second network flow information, wherein the second flow filter specifies a second memory queue in a second memory of the different processing node to receive the second network packet, (iv) determine the second forwarding information associated with the second network packet, wherein the second forwarding information identifies a second port of the network switch communicatively coupled to the second network adapter of the different processing node of the computing device and to which the second network packet is to be forwarded, and (v) transmit the determined second forwarding information to the network switch, the second network packet to be forwarded by the network switch based at least on the second forwarding information.

Example 31 includes the subject matter of any of Examples 27-30, and wherein the flow management module is further to transmit an instruction message to the computing device, wherein the instruction message to instruct the computing device to execute another application with one or more of the plurality of processing nodes of the computing device.

Example 32 includes a method for aligning network flows to processing resources, the method including receiving, by a network controller, architectural information from a computing device, the architectural information defining an architecture of each of a plurality of processing nodes of the computing device; receiving, by the network controller and from a network switch, a request for forwarding information associated with a network packet; determining, by the network controller, network flow information associated with the network packet based at least on the architectural information, wherein the network flow information identifies a target processing node of the plurality of processing nodes of the computing device to process the network packet based at least on an application executed by the target processing node; transmitting, by the network controller, the determined network flow information to the computing device to program a flow filter in a network adapter of the target processing node based at least on the network flow information, wherein the flow filter specifies a memory queue in a memory of the target processing node to receive the network packet; determining, by the network controller, the forwarding information associated with the network packet, wherein the forwarding information identifies a port of the network switch communicatively coupled to the network adapter of the target processing node of the computing device and to which the network packet is to be forwarded; and transmitting, by the network controller, the determined forwarding information to the network switch, the network packet to be forwarded by the network switch based at least on the forwarding information.

Example 33 includes the subject matter of Example 32, and wherein receiving the architectural information from the computing device includes receiving at least one of application data indicative of applications executed by each processing node, processor data indicative of a processor of each of the processing nodes, processor core data indicative of processing cores of the processor of each of the processing nodes, memory queue data indicative of allocated memory queues in each of the processing nodes, or port data indicative of ports of network adapters of each of the processing nodes.

Example 34 includes the subject matter of any of Examples 32 and 33, and wherein receiving the architectural information from the computing device includes receiving application execution data indicative of applications executed by each processing core of a processor of each of the processing nodes; and wherein determining the network flow information includes determining network flow information associated with the network packet based at least on the application execution data, wherein the network flow information identifies the target processing node of the plurality of processing nodes of the computing device to process the network packet based at least on an application executed by a processing core of the target processing node.

Example 35 includes the subject matter of any of Examples 32-34, and wherein the forwarding information includes first forwarding information, the request for forwarding information includes a request for the first forwarding information, the network packet includes a first network packet, the network flow information includes first network flow information, the flow filter includes a first flow filter, the memory of the target processing node includes a first memory, the memory queue in the memory of the target processing node includes a first memory queue in the first memory of the target processing node, and the network adapter of the target processing node includes a first network adapter of the target processing node; and further including receiving, by the network controller and from the network switch, a second request for second forwarding information associated with a second network packet; determining, by the network controller, second network flow information associated with the second network packet based at least on the architectural information, wherein the second network flow information identifies a different processing node of the plurality of processing nodes of the computing device to process the second network packet based at least on another application executed by the different processing node; transmitting, by the network controller, the determined second network flow information to the computing device to program a second flow filter in a second network adapter of the different processing node based at least on the second network flow information, wherein the second flow filter specifies a second memory queue in a second memory of the different processing node to receive the second network packet; determining, by the network controller, the second forwarding information associated with the second network packet, wherein the second forwarding information identifies a second port of the network switch communicatively coupled to the second network adapter of the different processing node of the computing device and to which the second network packet is to be forwarded; and transmitting, by the network controller, the determined second forwarding information to the network switch, the second network packet to be forwarded by the network switch based at least on the second forwarding information.

Example 36 includes the subject matter of any of Examples 32-35, and further including transmitting, by the network controller, an instruction message to the computing device, wherein the instruction message instructs the computing device to execute another application with one or more of the plurality of processing nodes of the computing device.

Example 37 includes a network controller for alignment of network flows to processing resources, the network controller including a processor; and a memory having stored therein a plurality of instructions that when executed by the processor cause the network controller to perform the method of any of Examples 32-36.

Example 38 includes one or more machine-readable media including a plurality of instructions stored thereon that in response to being executed result in a network controller performing the method of any of Examples 32-36.

Example 39 include a network controller for alignment of network flows to processing resources, the network controller including means for receiving architectural information from a computing device, the architectural information defining an architecture of each of a plurality of processing nodes of the computing device; means for receiving, from a network switch, a request for forwarding information associated with a network packet; means for determining network flow information associated with the network packet based at least on the architectural information, wherein the network flow information identifies a target processing node of the plurality of processing nodes of the computing device to process the network packet based at least on an application executed by the target processing node; means for transmitting the determined network flow information to the computing device to program a flow filter in a network adapter of the target processing node based at least on the network flow information, wherein the flow filter specifies a memory queue in a memory of the target processing node to receive the network packet; means for determining the forwarding information associated with the network packet, wherein the forwarding information identifies a port of the network switch communicatively coupled to the network adapter of the target processing node of the computing device and to which the network packet is to be forwarded; and means for transmitting the determined forwarding information to the network switch, the network packet to be forwarded by the network switch based at least on the forwarding information.

Example 40 includes the subject matter of Example 39, and wherein the means for receiving the architectural information from the computing device includes means for receiving at least one of application data indicative of applications executed by each processing node, processor data indicative of a processor of each of the processing nodes, processor core data indicative of processing cores of the processor of each of the processing nodes, memory queue data indicative of allocated memory queues in each of the processing nodes, or port data indicative of ports of network adapters of each of the processing nodes.

Example 41 includes the subject matter of any of Examples 39 and 40, and wherein the means for receiving the architectural information from the computing device includes means for receiving application execution data indicative of applications executed by each processing core of a processor of each of the processing nodes; and wherein the means for determining the network flow information includes means for determining network flow information associated with the network packet based at least on the application execution data, wherein the network flow information identifies the target processing node of the plurality of processing nodes of the computing device to process the network packet based at least on an application executed by a processing core of the target processing node.

Example 42 includes the subject matter of any of Examples 39-41, and wherein the forwarding information includes first forwarding information, the request for forwarding information includes a request for the first forwarding information, the network packet includes a first network packet, the network flow information includes first network flow information, the flow filter includes a first flow filter, the memory of the target processing node includes a first memory, the memory queue in the memory of the target processing node includes a first memory queue in the first memory of the target processing node, and the network adapter of the target processing node includes a first network adapter of the target processing node; and further including means for receiving, from the network switch, a second request for second forwarding information associated with a second network packet; means for determining second network flow information associated with the second network packet based at least on the architectural information, wherein the second network flow information identifies a different processing node of the plurality of processing nodes of the computing device to process the second network packet based at least on another application executed by the different processing node; means for transmitting the determined second network flow information to the computing device to program a second flow filter in a second network adapter of the different processing node based at least on the second network flow information, wherein the second flow filter specifies a second memory queue in a second memory of the different processing node to receive the second network packet; means for determining the second forwarding information associated with the second network packet, wherein the second forwarding information identifies a second port of the network switch communicatively coupled to the second network adapter of the different processing node of the computing device and to which the second network packet is to be forwarded; and means for transmitting the determined second forwarding information to the network switch, the second network packet to be forwarded by the network switch based at least on the second forwarding information.

Example 43 includes the subject matter of any of Examples 39-42, and further including means for transmitting an instruction message to the computing device, wherein the instruction message instructs the computing device to execute another application with one or more of the plurality of processing nodes of the computing device.

Example 44 includes a network switch for aligning network flows to processing resources, the network switch including a packet forwarding module to (i) receive a network packet from a remote computing device via a first port of the network switch, (ii) transmit a request for forwarding information associated with the received network packet to a network controller, (iii) receive the forwarding information from the network controller, the forwarding information indicative of a second port of the network switch to which the received network packet is to be forwarded, and (iv) forward the received network packet to the second port for transmission to a computing device, the received network packet to be processed by an application executed by a target processing node of a plurality of processing nodes of the computing device.

Example 45 includes the subject matter of Example 44, and further including a connection management module to transmit connection information to the network controller, wherein the connection information is indicative of one or more network connections between the network switch and at least one of the computing device or the remote computing device via one or more ports of the network switch.

Example 46 includes a method for aligning network flows to processing resources, the method including receiving, by a network switch, a network packet from a remote computing device via a first port of the network switch; transmitting, by the network switch, a request for forwarding information associated with the received network packet to a network controller; receiving, by the network switch, the forwarding information from the network controller, the forwarding information indicative of a second port of the network switch to which the received network packet is to be forwarded; and forwarding, by the network switch, the received network packet to the second port for transmission to a computing device, the received network packet to be processed by an application executed by a target processing node of a plurality of processing nodes of the computing device.

Example 47 includes the subject matter of Example 46, and further including transmitting, by the network switch, connection information to the network controller, wherein the connection information is indicative of one or more network connections between the network switch and at least one of the computing device or the remote computing device via one or more ports of the network switch.

Example 48 includes a network switch for alignment of network flows to processing resources, the network switch including a processor; and a memory having stored therein a plurality of instructions that when executed by the processor cause the network switch to perform the method of any of Examples 46 or 47.

Example 49 includes one or more machine-readable media including a plurality of instructions stored thereon that in response to being executed result in a network switch performing the method of any of Examples 46 or 47.

Example 50 includes a network switch for alignment of network flows to processing resources, the network switch including means for receiving a network packet from a remote computing device via a first port of the network switch; means for transmitting a request for forwarding information associated with the received network packet to a network controller; means for receiving the forwarding information from the network controller, the forwarding information indicative of a second port of the network switch to which the received network packet is to be forwarded; and means for forwarding the received network packet to the second port for transmission to a computing device, the received network packet to be processed by an application executed by a target processing node of a plurality of processing nodes of the computing device.

Example 51 includes the subject matter of Example 50, and further including means for transmitting connection information to the network controller, wherein the connection information is indicative of one or more network connections between the network switch and at least one of the computing device or the remote computing device via one or more ports of the network switch.

The invention claimed is:

1. A computing device for alignment of network flows to processing resources, the computing device comprising:
   one or more processors;
   a memory storing a plurality of instructions, which, when executed by the one or more processors, causes the computing device to:
   transmit architectural information to a network controller, the architectural information defining an architecture of each processing node of a plurality of processing nodes of the computing device, wherein each processing node includes a processor, a memory, and a network adapter, and wherein the architectural information is indicative of information regarding the processor and one or more memory banks of each processing node, applications executed by each processing node, and memory spaces of ports of the network adapter of each processing node;
   receive network flow information from the network controller, wherein the network flow information is associated with a network packet and identifies a target processing node of the plurality of processing nodes to process the network packet based at least on an application executed by the target processing node;
   program a flow filter in the network adapter of the target processing node based at least on the network flow information to specify a memory queue in the memory of the target processing node to receive the network packet; and
   receive the network packet from a network switch, the network packet to be processed by the application executed by the target processing node.

2. The computing device of claim 1, wherein the processor of each processing node comprises a plurality of processing cores;
   wherein the architectural information comprises data indicative of the applications executed by each processing core of each processor of each processing node; and
   wherein to receive the network flow information comprises to receive network flow information from the network controller that identifies the target processing node to process the network packet based at least on an application executed by a processing core of the target processing node.

3. The computing device of claim 1, wherein the network adapter of the target processing node is further to (i) allocate the memory queue in the memory of the target processing node to a port of the network adapter, wherein to receive the network packet from the network switch comprises to receive the network packet from the network switch via the port of the network adapter and (ii) copy the received network packet to the memory queue in the memory of the target processing node allocated to the port of the network adapter.

4. The computing device of claim 3, wherein the application executed by the target processing node is to (i) determine whether the received network packet is available to be retrieved from the memory queue in the memory of the target processing node and (ii) retrieve the received network packet from the memory queue in the memory of the target processing node in response to a determination that the received network packet is available to be retrieved from the memory queue.

5. The computing device of claim 4, wherein to determine whether the network packet is available to be retrieved from the memory queue comprises at least one of (i) poll the memory queue in the memory of the target processing node as a function of a reference polling interval or (ii) receive an interrupt that indicates that the network packet is available to be retrieved from the memory queue.

6. The computing device of claim 3, wherein the network packet comprises a first network packet, the network flow information comprises first network flow information, the flow filter comprises a first flow filter, the memory of the target processing node comprises a first memory, the memory queue in the memory of the target processing node comprises a first memory queue in the first memory of the target processing node, and the network adapter of the target processing node comprises a first network adapter of the target processing node;
  wherein the plurality of instructions further causes the computing device to:
  receive second network flow information from the network controller, wherein the second network flow information is associated with a second network packet and identifies a different processing node of the plurality of processing nodes to process the second network packet based at least on another application executed by the different processing node; and
  program a second flow filter in a second network adapter of the different processing node based at least on the second network flow information to specify a second memory queue in a second memory of the different processing node to receive the second network packet, wherein the second network adapter of the different processing node to receive the second network packet from the network switch, the second network packet to be processed by the another application executed by the different processing node.

7. The computing device of claim 1, wherein the target processing node to execute another application based at least on instructions received from the network controller.

8. One or more non-transitory, machine-readable media comprising a plurality of instructions stored thereon that in response to being executed by a computing device, cause the computing device to:
  transmit architectural information to a network controller, the architectural information defining an architecture of each processing node of a plurality of processing nodes of the computing device, wherein each processing node includes a processor, a memory, and a network adapter, and wherein the architectural information includes information regarding the processor and one or more memory banks of each processing node, information regarding applications executed by each processing node, and information regarding memory spaces of ports of the network adapter of each processing node;
  receive network flow information from the network controller, wherein the network flow information is associated with a network packet and identifies a target processing node of the plurality of processing nodes to process the network packet based at least on an application executed by the target processing node;
  program a flow filter in the network adapter of the target processing node based at least on the network flow information to specify a memory queue in the memory of the target processing node to receive the network packet; and
  receive, by the network adapter of the target processing node, the network packet from a network switch, the network packet to be processed by the application executed by the target processing node.

9. The one or more non-transitory, machine-readable media of claim 8, wherein the processor of each processing node comprises a plurality of processing cores;
  wherein the architectural information comprises data indicative of the applications executed by each processing core of each processor of each processing node; and
  wherein to receive the network flow information comprises to receive network flow information from the network controller that identifies the target processing node to process the network packet based at least on an application executed by a processing core of the target processing node.

10. The one or more non-transitory, machine-readable media of claim 8, wherein the plurality of instructions further cause the computing device to:
  allocate, by the network adapter of the target processing node, the memory queue in the memory of the target processing node to a port of the network adapter, wherein to receive the network packet from the network switch comprises to receive the network packet from the network switch via the port of the network adapter; and
  copy, by the network adapter of the target processing node, the received network packet to the memory queue in the memory of the target processing node allocated to the port of the network adapter.

11. The one or more non-transitory, machine-readable media of claim 10, wherein the plurality of instructions further cause the computing device to:
  determine, by the application executed by the target processing node, whether the received network packet is available to be retrieved from the memory queue in the memory of the target processing node; and
  retrieve, by the application executed by the target processing node, the received network packet from the memory queue in the memory of the target processing node in response to a determination that the received network packet is available to be retrieved from the memory queue.

12. The one or more non-transitory, machine-readable media of claim 11, wherein to determine whether the network packet is available to be retrieved from the memory queue comprises at least one of (i) poll the memory queue in the memory of the target processing node as a function of a reference polling interval or (ii) receive an interrupt that indicates that the network packet is available to be retrieved from the memory queue.

13. The one or more non-transitory, machine-readable media of claim 10, wherein the network packet comprises a first network packet, the network flow information comprises first network flow information, the flow filter comprises a first flow filter, the memory of the target processing node comprises a first memory, the memory queue in the memory of the target processing node comprises a first memory queue in the first memory of the target processing node, and the network adapter of the target processing node comprises a first network adapter of the target processing node; and
  wherein plurality of instructions further cause the computing device to: (i) receive second network flow information from the network controller, wherein the second network flow information is associated with a second network packet and identifies a different processing node of the plurality of processing nodes to process the second network packet based at least on another application executed by the different processing node; (ii) program a second flow filter in a second network adapter of the different processing node based at least on the second network flow information to specify a second memory queue in a second memory of the different processing node to receive the second network packet, and (iii) receive, by the second network adapter of the different processing node, the second network packet from the network switch, the second network packet to be processed by the another application executed by the different processing node.

14. The one or more non-transitory, machine-readable media of claim 8, wherein the plurality of instructions further cause the computing device to execute, by the target processing node, another application based at least on instructions received from the network controller.

15. A network controller for alignment of network flows to processing resources, the network controller comprising:
one or more processors; and
a memory storing a plurality of instructions, which, when executed, causes the network controller to:
receive architectural information from a computing device, the architectural information defining an architecture of each of a plurality of processing nodes of the computing device, wherein the architectural information is indicative of information regarding the processor and one or more memory banks of each processing node, information regarding applications executed by each processing node, and information regarding memory spaces of ports of the network adapter of each processing node; and
receive, from a network switch, a request for forwarding information associated with a network packet;
determine network flow information associated with the network packet based at least on the architectural information, wherein the network flow information identifies a target processing node of the plurality of processing nodes of the computing device to process the network packet based at least on an application executed by the target processing node;
transmit the determined network flow information to the computing device to program a flow filter in a network adapter of the target processing node based at least on the network flow information, wherein the flow filter specifies a memory queue in a memory of the target processing node to receive the network packet;
determine the forwarding information associated with the network packet, wherein the forwarding information identifies a port of the network switch communicatively coupled to the network adapter of the target processing node of the computing device and to which the network packet is to be forwarded; and
transmit the determined forwarding information to the network switch, the network packet to be forwarded by the network switch based at least on the forwarding information.

16. The network controller of claim 15, wherein to receive the architectural information from the computing device comprises to receive application execution data indicative of applications executed by each processing core of a processor of each of the processing nodes; and
wherein to determine the network flow information comprises to determine network flow information associated with the network packet based at least on the application execution data, wherein the network flow information identifies the target processing node of the plurality of processing nodes of the computing device to process the network packet based at least on an application executed by a processing core of the target processing node.

17. The network controller of claim 15, wherein the forwarding information comprises first forwarding information, the request for forwarding information comprises a request for the first forwarding information, the network packet comprises a first network packet, the network flow information comprises first network flow information, the flow filter comprises a first flow filter, the memory of the target processing node comprises a first memory, the memory queue in the memory of the target processing node comprises a first memory queue in the first memory of the target processing node, and the network adapter of the target processing node comprises a first network adapter of the target processing node; and
wherein the plurality of instructions further causes the network controller to:
receive, from the network switch, a second request for second forwarding information associated with a second network packet;
determine second network flow information associated with the second network packet based at least on the architectural information, wherein the second network flow information identifies a different processing node of the plurality of processing nodes of the computing device to process the second network packet based at least on another application executed by the different processing node;
transmit the determined second network flow information to the computing device to program a second flow filter in a second network adapter of the different processing node based at least on the second network flow information, wherein the second flow filter specifies a second memory queue in a second memory of the different processing node to receive the second network packet;
determine the second forwarding information associated with the second network packet, wherein the second forwarding information identifies a second port of the network switch communicatively coupled to the second network adapter of the different processing node of the computing device and to which the second network packet is to be forwarded; and
transmit the determined second forwarding information to the network switch, the second network packet to be forwarded by the network switch based at least on the second forwarding information.

18. The network controller of claim 15, wherein the flow management module is further to transmit an instruction message to the computing device, wherein the instruction message to instruct the computing device to execute another application with one or more of the plurality of processing nodes of the computing device.

19. One or more non-transitory, machine-readable media comprising a plurality of instructions stored thereon that in response to being executed by a network controller, cause the network controller to:
receive architectural information from a computing device, the architectural information defining an architecture of each of a plurality of processing nodes of the computing device, wherein the architectural information is indicative of information regarding the processor and one or more memory banks of each processing node, information regarding applications executed by each processing node, and information regarding memory spaces of ports of the network adapter of each processing node;

receive, from a network switch, a request for forwarding information associated with a network packet;

determine network flow information associated with the network packet based at least on the architectural information, wherein the network flow information identifies a target processing node of the plurality of processing nodes of the computing device to process the network packet based at least on an application executed by the target processing node;

transmit the determined network flow information to the computing device to program a flow filter in a network adapter of the target processing node based at least on the network flow information, wherein the flow filter specifies a memory queue in a memory of the target processing node to receive the network packet;

determine the forwarding information associated with the network packet, wherein the forwarding information identifies a port of the network switch communicatively coupled to the network adapter of the target processing node of the computing device and to which the network packet is to be forwarded; and transmit the determined forwarding information to the network switch, the network packet to be forwarded by the network switch based at least on the forwarding information.

20. The one or more non-transitory, machine-readable media of claim 19, wherein to receive the architectural information from the computing device comprises to receive application execution data indicative of applications executed by each processing core of a processor of each of the processing nodes; and wherein to determine the network flow information comprises to determine network flow information associated with the network packet based at least on the application execution data, wherein the network flow information identifies the target processing node of the plurality of processing nodes of the computing device to process the network packet based at least on an application executed by a processing core of the target processing node.

21. The one or more non-transitory, machine-readable media of claim 19, wherein the forwarding information comprises first forwarding information, the request for forwarding information comprises a request for the first forwarding information, the network packet comprises a first network packet, the network flow information comprises first network flow information, the flow filter comprises a first flow filter, the memory of the target processing node comprises a first memory, the memory queue in the memory of the target processing node comprises a first memory queue in the first memory of the target processing node, and the network adapter of the target processing node comprises a first network adapter of the target processing node; and wherein the plurality of instructions further cause the network controller to: (i) receive, from the network switch, a second request for second forwarding information associated with a second network packet, (ii) determine second network flow information associated with the second network packet based at least on the architectural information, wherein the second network flow information identifies a different processing node of the plurality of processing nodes of the computing device to process the second network packet based at least on another application executed by the different processing node, (iii) transmit the determined second network flow information to the computing device to program a second flow filter in a second network adapter of the different processing node based at least on the second network flow information, wherein the second flow filter specifies a second memory queue in a second memory of the different processing node to receive the second network packet, (iv) determine the second forwarding information associated with the second network packet, wherein the second forwarding information identifies a second port of the network switch communicatively coupled to the second network adapter of the different processing node of the computing device and to which the second network packet is to be forwarded, and (v) transmit the determined second forwarding information to the network switch, the second network packet to be forwarded by the network switch based at least on the second forwarding information.

* * * * *